United States Patent
Barton et al.

(10) Patent No.: US 6,633,614 B1
(45) Date of Patent: Oct. 14, 2003

(54) MULTICARRIER PERSONAL ACCESS COMMUNICATION SYSTEM

(75) Inventors: Melbourne Barton, Somerville, NJ (US); Kouk-Shoong Daniel Wong, Eatontown, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/476,466

(22) Filed: Dec. 30, 1999

Related U.S. Application Data

(60) Provisional application No. 60/154,097, filed on Sep. 15, 1999.

(51) Int. Cl.[7] .................................. H04L 5/12; H04L 23/02
(52) U.S. Cl. ........................ 375/264; 375/261; 375/295
(58) Field of Search ................................ 375/264, 260, 375/261, 202, 308; 370/210, 18, 206, 347, 204; 725/106; 714/790; 329/304

(56) References Cited

U.S. PATENT DOCUMENTS

| | | | | |
|---|---|---|---|---|
| 5,329,552 A | * | 7/1994 | de Couasnon et al. | ...... 375/295 |
| 5,428,643 A | * | 6/1995 | Razzell | ........................ 375/308 |
| 5,548,582 A | * | 8/1996 | Brajal et al. | ................. 370/206 |
| 6,175,550 B1 | * | 1/2001 | van Nee | ...................... 370/206 |
| 6,385,190 B1 | * | 5/2002 | Malkamaki et al. | ........ 370/347 |
| 6,449,246 B1 | * | 9/2002 | Barton et al. | ............... 370/210 |
| 6,487,252 B1 | * | 11/2002 | Kleider et al. | .............. 375/260 |

OTHER PUBLICATIONS

Thomas Eng, Ning Kong, and Laurence B. Milstein, "Comparison of Diversity Combining Techniques for Rayleigh — Fading Channels", IEEE Transactions on Communications, vol. 44, No. 9, Sep. 1996, pp. 1117–1129.

A. Noerpel, et al., "PACS: Personal Access Communications System—A Tutorial," IEEE Personal Communications, Jun. 1996, pp. 32–43.

* cited by examiner

Primary Examiner—Stephen Chin
Assistant Examiner—Edith Yeh
(74) Attorney, Agent, or Firm—Joseph Giordano

(57) ABSTRACT

A highly modular PACS-based system that combines the advantages of Optical Frequency Division Multiplexing (OFDM) and Personal Access Communication System (PACS) with Time Division Multiple Access (TDMA) technology. The system is arranged to support high-speed (higher than the 32 kbps of PACS) wireless access services to fixed and mobile users. For example, nominal user data rates of 32-to-356 kbps are attainable, and ever the higher speed of 768 kbps is possible for short ranges.

6 Claims, 18 Drawing Sheets

MULTICARRIER PERSONAL ACCESS COMMUNICATION SYSTEM

CROSS-REFERENCE TO RELATED APPLICATION

This application is a non-provisional application of provisional application Serial No. 60/154,097, filed Sep. 15, 1999. It is also related to Barton-Wong applications Ser. Nos.: 09/475,218, 09/476,677, 09/476,465, and 09/475,219, all filed Dec. 30, 1999, and the last application having issued as U.S. Pat. No. 6,449,246, Sep. 10, 2002.

BACKGROUND OF THE DISCLOSURE

1. Field of the Invention

This invention relates generally to wireless telecommunications, and, more particularly, to methodologies and concomitant circuitry for high-speed wireless access services to fixed and mobile telecommunications users.

2. Description of the Background

The Personal Access Communication System (PACS) system provides high performance, low complexity radio technology for interoperable wireless access using licensed and unlicensed frequency spectra in the 2 GHz emerging technologies frequency band. A representative article which discusses both the history and technological innovations of the PACS system is the article entitled "PACS: Personal Access Communication System—A Tutorial", authored by Noerpel et al. and published in the IEEE Personal Communications, June 1996, pages 32–43.

It is well-known in the industry that the Orthogonal Frequency Division Multiplexing (OFDM) technology is an effective means of mitigating Intersymbol Interference (ISI) on multipath fading channels when operated in environments where the Root-Mean-Square (RMS) delay spread is a significant impairment.

However, the art is devoid of teachings and suggestions for combining OFDM and PACS to extend the range of applications and capabilities of PACS, especially in an environment wherein the RMS delay spread is significant.

In accordance with the present invention, a so-called Multicarrier Personal Access Communication System (MPACS) system is a highly modular PACS-based system that combines the advantages of OFDM and PACS, as well as the well-known Time Division Multiple Access (TDMA) technology. MPACS is arranged to support higher-speed (higher than the 32 kbps of PACS) wireless access services to fixed and mobile users. For example, nominal user data rates of 32-to-356 kbps are attainable, and ever the higher speed of 768 kbps is possible for short ranges.

A primary design objective for MPACS, at the physical layer system, is that of retaining as many of the link-level system parameters of PACS as possible, in order to minimize incompatibilities between them. In this respect, the same Time Division Multiple Access (TDMA) frame format and approximately the same Radio Frequency (RF) channel structure is deployed in MPACS. For example, the main licensed version of the PACS system parameters that are of interest in the MPACS system are listed in Table 1 below.

The PACS baseband signal is based on a Square-Root Raised Cosine (SRC) transmit filter and has a single-sided 3 dB bandwidth of 96 kHz, and a roll-off factor of $\alpha=0.5$, resulting in a total single-sided bandwidth of 144 kHz. Since the transmitted signal is double the single-sided bandwidth, the total bandwidth is 288 kHz (this bandwidth is frequently specified as 300 kHz as in Table 1). In MPACS a higher level Quadrature Amplitude Modulation (QAM), that is, above 4-level QAM (which is essentially the same as Differential Quadrature Phase Shift Key (DQPSK) of Table 1) is used to increase the data range beyond the values of Table 1. This use of higher level QAM has an impact on error rate performance and/or achievable range, and provision for each must be accommodated in the design of MPACS.

TABLE 1

| PARAMETER | VALUE |
| --- | --- |
| Available Spectrum | 10 MHz |
| RF Channel Bandwidth | 300 kHz |
| Transmission Bit Rate | 384 kbps |
| Symbol Transmission Rate | 192 kbauds |
| User Throughput/Timeslot | 32 kbps |
| Modulation Type | $\pi/4$ - DQPSK |
| Nyquist Filter Roll-Off Factor | $\alpha = 0.5$ |
| TDMA Frame Duration | 2.5 ms |
| Number of Timeslots/Frame | 8 |
| Timeslot Duration | 312.5 $\mu s$ |
| Duplexing Method | Frequency Division Duplex/TDMA |

SUMMARY OF THE INVENTION

The shortcomings and limitations of the prior art are obviated, in accordance with the present invention, by a methodology and concomitant circuitry wherein, generally, the advantageous properties of ODFM and PACS are combined, along with TDMA properties, to extend the range and capabilities of PACS.

Broadly, in accordance with one method aspect of the present invention, a method for propagating a sequence of input bits as a time-division multiple-access frame over a wireless channel includes: (a) converting the sequence of input bits into a corresponding set of input symbols wherein each of the input symbols represents a unique plurality of the input bits; (b) partitioning the time-division multiple-access frame into a plurality of slots each having a prescribed bandwidth and assigning one of the slots to the sequence of input bits; and (c) subdividing the prescribed bandwidth of the assigned slot into a plurality of orthogonal frequency division multiplexed subchannels each conveying a corresponding one of the input symbols from the set.

In accordance with another aspect of the invention, the method for propagating a sequence of input bits as a wireless channel signal includes: (a) converting the sequence of input bits into a corresponding set of input symbols wherein each of the input symbols represents a unique plurality of the input bits; (b) modulating each of the input symbols in the set to produce a corresponding set of complex symbols; (c) computing the inverse Discrete Fourier Transform of the set of complex symbols to produce a transformed set of symbols; (d) augmenting the transformed set of symbols with cyclic prefix symbols determined with reference to the transformed set to produce a set of output symbols; and (e) processing the set of output symbols to generate the wireless channel signal.

Broadly, in accordance with the system aspects of the present invention, these aspects include circuitry commensurate with the foregoing methodologies.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

To fully appreciate the import of the signal processing system of the present invention, as well as to gain an appreciation for the underlying operational principles of the present invention, it is instructive to first present a high-level description of the fundamentals of the OFDM system advantageously deployed by MPACS. This overview also serves to introduce terminology so as to facilitate the more detailed description of the illustrative embodiment, which follows the overview of OFDM.

OFDM Principles

In an OFDM system, the transmission bandwidth is subdivided into N independent narrowband subchannels, with one and only one symbol transmitted on each subchannel. If the effective OFDM block duration is $T_E$ and the OFDM sampling rate is $f_s=1/T$, then the effective OFDM block duration is $T_E=NT$. In the case of an orthogonal subcarrier, the minimum bandwidth for each subchannel is $B_s=1/NT$, which is also the minimum separation between consecutive overlapping subchannels. Hence the center frequency $f_k$ of the $k^{th}$ subchannel of the baseband OFDM signal is given by:

$$f_k = f_0 + \frac{k}{NT}, \text{ where } k = 0, 1, \ldots, N-1. \tag{1}$$

Figure 1:
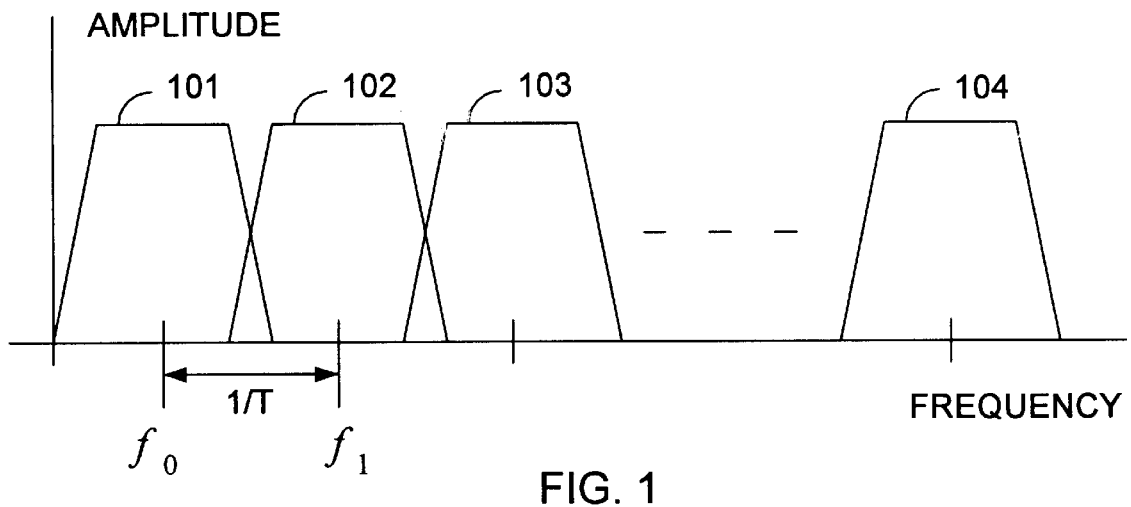
FIG. 1 illustrates OFDM channel bandwidth subdivision into narrowband, overlapping subchannels with a given separation between the subcarrier center frequencies.

A depiction of overlapping subchannels 101, ..., 104 is shown in FIG. 1, wherein subchannel 101 is shown as overlapping subchannel 102, whereas subchannel 102 overlaps both subchannels 101 and 103. The subcarrier center frequencies are also depicted in FIG. 1, along with the minimum separation of 1/T between subcarrier center frequencies. Negative frequencies in the baseband signal can be accounted for by noting, for example, that if N is even, then $f_0=(-N/2+1)/NT$. It should be noted that even though the minimum separation between the subchannels results in overlapping subchannels, orthogonality between the subchannels is still maintained.

Overlapping subchannel OFDM systems can be implemented using the Discrete Fourier Transform (DFT). In such implementations, however, each subchannel possesses a spectrum with non-negligible sidelobes. The sidelobes can be reduced by extending the data frame to include a so-called "cyclic prefix" composed of, for example, the last V samples from the output of an inverse DFT (IDFT), and prefixed to the IDFT.

Moreover, practical OFDM techniques always include a guard interval $T_G$ to remove Intersymbol Interference (ISI) caused by non-orthogonal subchannels due to deviations for the ideal model for orthogonal subchannels. When a guard interval is used, the resulting OFDM symbol duration becomes $T_S=T_E+T_G$. If the guard interval is composed of V1 cyclic prefix and V2 cyclic postfix samples, then $T_G=VT$, where V=V1+V2. As alluded to above, the guard interval is implemented in practice by prefixing (postfixing) the last V1 (first V2) samples from the output of the IDFT to the sequence of IDFT output samples. If the precursor guard interval is greater than the maximum value of the delay of the multipath fading channel, then ISI due to Inter-Block Interference (IBI) is eliminated. If the channel is not ideal, ISI due to Inter-Channel Interference (ICI) (caused by interference among OFDM subchannels) cannot be totally eliminated. In practice, the guard interval is typically chosen to be in the range of 10% to 20% of the effective OFDM block length, although for MPACS the range may also be dependent upon the TDMA radio link, and may be adjusted accordingly.

Another parameter that is important to an OFDM system implementation is the achievable data rate. If there are N OFDM subchannels, and an M-ary modulation technique is deployed to assign the same number of data bits on each subchannel, then the maximum achievable rate is given by:

$$R_b = \frac{N \log_2 M}{T_E + T_G}. \quad (2)$$

As a result of the guard interval, the maximum achievable data rate is reduced by a factor of V/(N+V). As an example of this effect, suppose that N=4, M=16, $T_E$=312 μs, and $T_G$=88 μs, so that $T_E+T_G$=400 μs. Then $R_b$=40 kbps instead of the rate of about 51.3 kbps assuming no guard interval.

On a frequency-selective fading channel, the subchannels suffer from different levels of attenuation, which might lead to different values of Signal-to-Interference Ratio (SIR) and Bit Error Rate (BER) on individual subchannels. Without transmitter and/or receiver optimization, the theoretical data rate of equation (2) may not be achievable because information will be lost on some subchannels. A simple method to increase BER performance (at the expense of throughput) is not using weak subchannels for transmission. The decision to leave out subchannels is, for example, based on a ranking of amplitudes in the subchannels.

OFDM Considerations

One of the principal advantages of OFDM is its utility for transmission at very near optimum performance on multipath fading channels without equalization. If OFDM is to operate at close to its theoretical performance limits, it must be arranged to overcome two main limitations, namely:

(a) peak envelope variations resulting in large Peak-to-Average power Ratio (PAR) or, equivalently, "crest factor"; and (b) sensitivity to timing and frequency offset errors.

With respect to the first limitation, the composite OFDM baseband signal exhibits non-constant envelope variations. This property makes OFDM sensitive to nonlinear effects in high-power amplifiers. This phenomenon is frequently expressed as the PAR or crest factor. The peak envelope of the OFDM signal increases linearly with N, and the average envelope is proportional to the square root of N; hence, the theoretical PAR increases in proportion to the square root of N. There are a number of well-known techniques to overcome the effects of PAR.

With respect to the second limitation, carrier frequency offset can degrade the performance of OFDM much more than single-carrier systems because it introduces interference among the multiplicity of subcarriers in the OFDM signal that are closely spaced in frequency compared to the channel bandwidth. There are two deleterious effects caused by an offset in frequency between the transmitter and receiver local oscillator: (i) a reduction of signal amplitude in the output of each of the subcarriers; and (ii) introduction of ICI from other subcarriers that are no longer orthogonal to each other. In practical applications, carrier synchronization is achieved using pilot-tone-aided or pilot-symbol-aided techniques. The carrier frequency offset should be limited to about an order of magnitude or less than the subchannel bandwidth to insure adequate performance of the OFDM system. The impact of carrier frequency offset is less severe in OFDM systems that use differential detection techniques.

Timing offset in OFDM systems also rotates and attenuates transmitted symbols, and introduces ICI from other subchannels due to loss of orthogonality. If the guard interval $T_G$ is greater than the timing offset, then ICI due to loss of orthogonality from timing errors is mitigated. There are known techniques to reduce carrier frequency and timing offset errors.

By way of reiteration, some important advantages of OFDM to be exploited in accordance with the present invention are summarized as follows:

(a) allows the use of coding to trade bandwidth for peak envelope reduction;

(b) supports dynamic channel assignment to improve spectrum efficiency; and (c) allows flexible use of aggregated timeslots/carriers for service needs.

On the other hand, two limitations of OFDM must be recognized and dealt with in accordance with the techniques of the present invention, these limitations being: (i) peak envelope variations require a PAR reduction scheme; and (ii) robust timing and/or frequency recovery circuits are required.

Illustrative Embodiment in Accordance with the Present Invention

General Considerations

The MPACS system, which illustrates the principles of the present invention, combines the advantages of OFDM and PACS to extend the range of applications and capabilities of, and provide performance improvements, over PACS. For expository purposes, the same TDMA frame format and RF channel structure as in PACS are used for the MPACS system. It is readily contemplated that these strictures may be relaxed, such as by eliminating the TDMA protocol, or by using OFDM in a multiple access realization.

As to the physical link layer, new aspects which have been incorporated into the MPACS system are highlighted (but this enumeration is not intended to be limiting):

(1) utilization of M-ary Quadrature Amplitude Modulation (M-QAM) with rectangular and square constellations, such as 4-QAM, 8-QAM, 16-QAM, and 32-QAM, as discussed in detail in the sequel; based upon the teachings of M-QAM, it is readily visualized how Quadrature Phase-Shift Keying (QPSK), Differential QPSK (DQPSK), and π/4 DQPSK may also be implemented (2) one IDFT per Subscriber Unit (SU) transmitter, and one or more DFT's per SU receiver, depending upon the number of diversity branches. The same number of IDFT-DFT processors are required at each Radio Port (RP)

Figure 2:
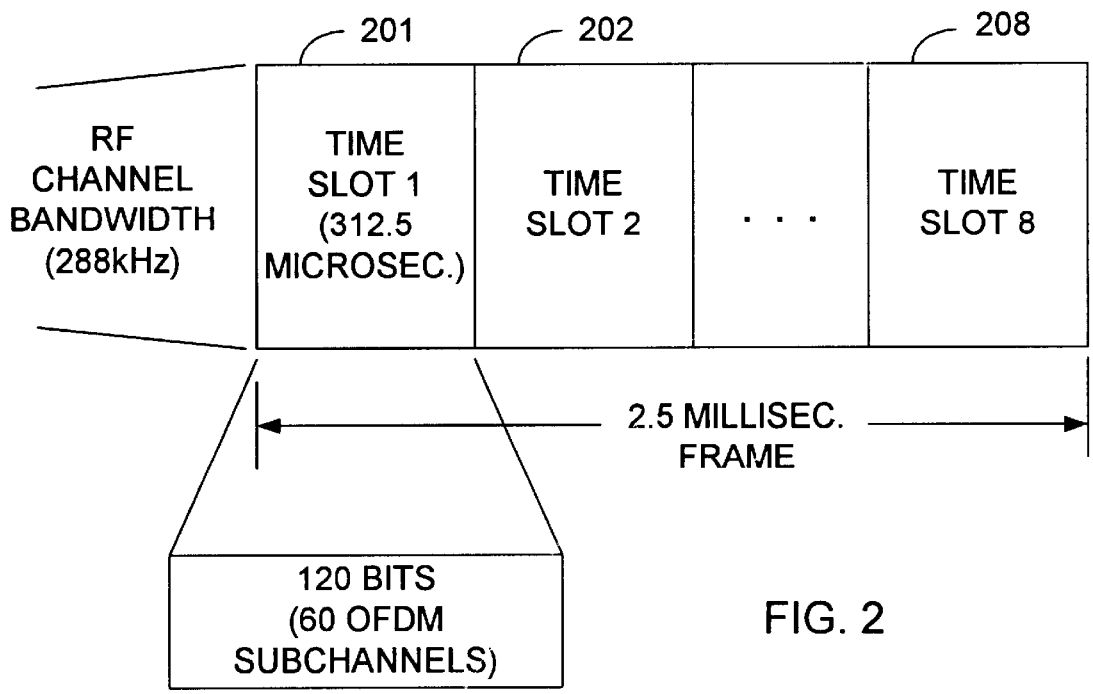
FIG. 2 is an exemplary channel structure in accordance with the present invention for one RF channel and 4-QAM modulation on each OFDM subchannel.

(3) Serial-to-Parallel (SPC) and Parallel-to-Serial Converter (PSC) pairs in the SU and RP transceivers (4) PAR reduction circuitry (5) guard interval insertion and removal circuitry (6) symbol timing and carrier frequency offset estimation circuitry (7) a look-up table with concomitant search algorithm to implement modulation by a modulator at the transmitter of the MPACS system, and demodulation in a demodulator at the receiver (8) reduced computational complexity using the Fast Fourier Transform to implement the IDFT and the DFT Channel Structure An example of the frame structure of the MPACS system in accordance with the present invention is shown in FIG. 2 for the exemplary case of 4-phase modulation (e.g., 4-QAM) on each OFDM subchannel. Eight timeslots 201, 202, . . . , 208, each 312.5 μs long, are associated with each 2.5 ms MPACS TDMA frame, on each RF channel having a bandwidth of nominally 288 kHz. Each timeslot supports one SU, which is the OFDM block length for single-timeslot operation.

In this configuration, OFDM is used to subdivide the RF channel bandwidth into N OFDM subchannels, and one symbol is transmitted on each subchannel. For example, suppose the requirement is to transmit 120 information bits between RP and SU in one timeslot. For four-phase modulation on each subchannel, then N=60 OFDM subchannels are required. If an exemplary single-carrier bandwidth is 288 kHz, then the OFDM subchannel bandwidth is $B_s$=4.8 kHz, and the effective OFDM block duration $T_E$=208.33 µs. Since the OFDM block length $T_s$=312.5 µs, then the potential OFDM guard interval is $T_G$=104.17 µs.

In practice, only a portion of this guard interval is dedicated to cyclic prefix samples used for multipath delay spread mitigation. This is because the maximum propagation delay of the multipath channel is, practically, well below this value. The remainder of the potential guard interval may, illustratively, be allocated to PAR symbols, channel coding, symbol timing recovery, and pilot recovery symbols (if utilized). Multi-timeslot operation is achieved by simply extending the number of OFDM subchannels in multiples of N. Table 2 below summarizes a range of radio link parameters, for single- and multiple-timeslot operations per SU, assuming four-phase modulation.

The MPACS system supports a 384 kbps transmission rate, and 32–256 kbps access speeds with four-phase modulation such as 4-QAM. For higher level QAM, the values of Table 2 remain the same; however, there is a corresponding increase in the data rate above that which is achievable to four-phase modulation. The calculations to derive Table 2 are those deployed in the previous paragraph.

TABLE 2

| Time-slots Per SU | 3-dB Bandwidth/ Sampling Rate (kHz) | | Number of Carriers | | Subchannel Bandwidth (kHz) | | Number of Guard Samples | |
|---|---|---|---|---|---|---|---|---|
| | Min. | Max. | Min. | Max. | Min. | Max. | Min. | Max. |
| 1 | 192 | 288 | 60 | 90 | 3.20 | 4.80 | 0 | 30 |
| 2 | 192 | 288 | 120 | 180 | 1.60 | 2.40 | 0 | 60 |
| 3 | 192 | 288 | 180 | 270 | 1.067 | 1.60 | 0 | 90 |
| 4 | 192 | 288 | 240 | 360 | 0.800 | 1.20 | 0 | 120 |
| 5 | 192 | 288 | 300 | 450 | 0.640 | 0.960 | 0 | 150 |
| 6 | 192 | 288 | 360 | 540 | 0.533 | 0.800 | 0 | 180 |
| 7 | 192 | 288 | 420 | 630 | 0.457 | 0.685 | 0 | 210 |
| 8 | 192 | 288 | 480 | 720 | 0.400 | 0.600 | 0 | 240 |

Illustrtive Embodiment

1.) Transmitter 300

Figure 3:
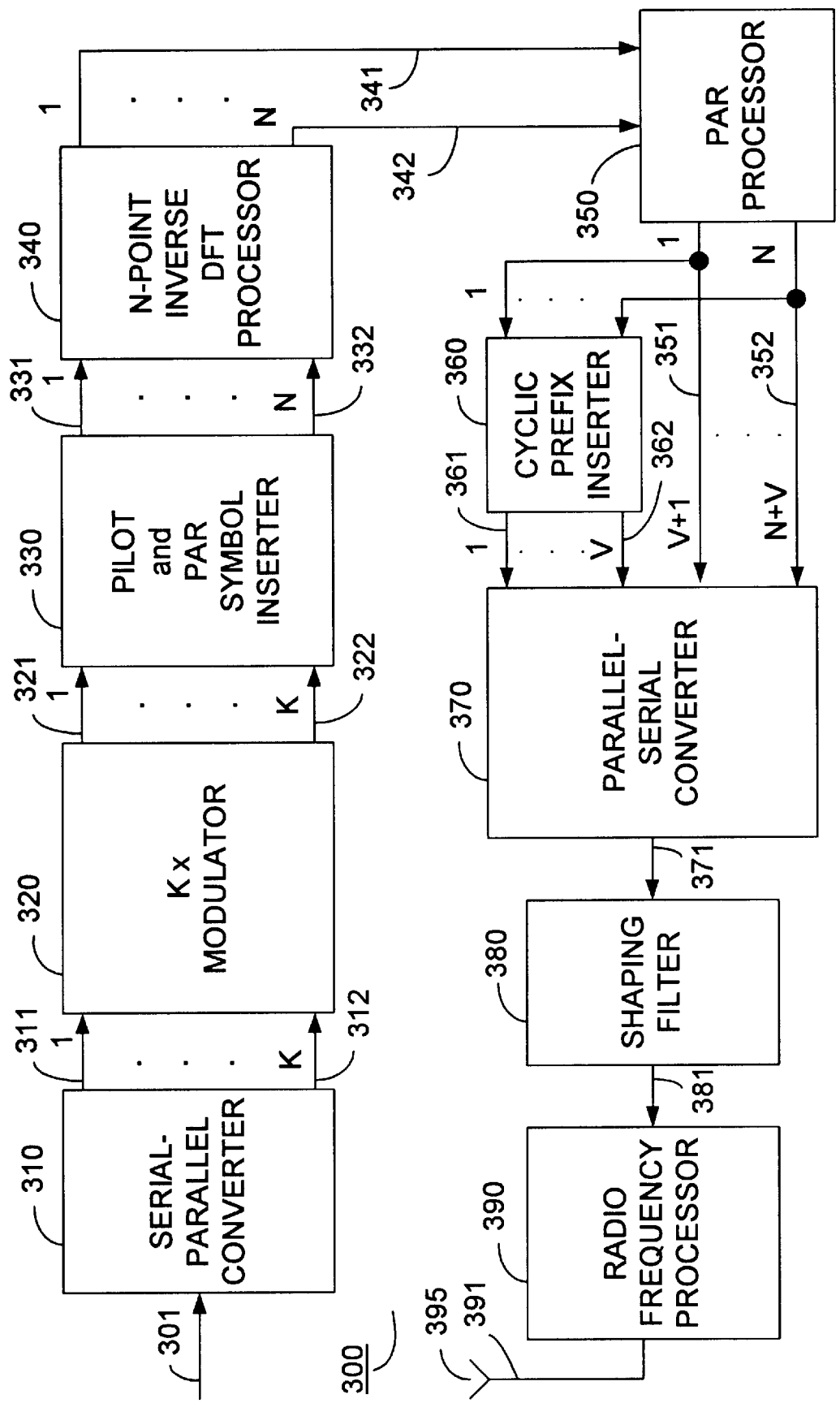
FIG. 3 is an illustrative embodiment of a transmitter as a high-level block diagram in accordance with the present invention.

A high-level block diagram of transmitter 300 in accordance with the present invention is shown in FIG. 3 wherein transmitter 300 is composed of the basically series arrangement of: (a) serial-to-parallel converter 310, which receives a serial stream of input data bits over input path 310 and produces K (K and K are used interchangeably in the sequel) parallel data bit streams on paths 311, . . . , 312; (b) modulator 320, coupled to device 310, for receiving K parallel data bit streams over paths 311, . . . , 312 as produced by converter 310—modulator 320 is typically of type QPSK/DQPSK (Quadrature Phase Shift Keying/Differential.QPSK) or M-QAM (M-ary Quadrature Amplitude Modulation); (c) pilot and PAR symbol inserter 330, coupled to modulator 320, which also receives K parallel input streams over paths 321, . . . , 322 from modulator 320, and which outputs N (N and N are used interchangeably in the sequel) parallel output streams onto paths 331, . . . , 332; (d) N-point Inverse DFT (Discrete Fourier Transform) processor 340, responsive to inserter 330, for receiving N parallel data streams over paths 331, . . . , 332 as produced by inserter 330; (e) PAR (Peak-to-Average) processor 350, coupled to IDFT processor 340, for receiving N parallel data streams over paths 341, . . . , 342 as produced by IDFT processor 340; (f) cyclic prefix inserter 360, coupled to PAR processor 150, for receiving N parallel data streams over paths 351, . . . , 352 as supplied by PAR processor 350; (g) parallel-to-serial converter 370, responsive to both PAR processor 350 and inserter 360, for receiving N+V parallel data streams—N data streams are received from PAR processor 350 over paths 351, . . . , 352, and V data streams are produced by inserter 360 and supplied over paths 361, . . , 362; (h) interference suppression shaping filter (e.g., a raised cosine filter) 380, responsive to converter 370, for receiving a serial stream of bits from converter 370 over path 371; (i) RF processor 390, responsive to filter 380, for receiving serial data from filter 380 over path 381—processor 390 effects: D/A conversion; up-conversion for converting the baseband signal on path 381 to a frequency suitable for over-the-air propagation utilizing a conventional local oscillator (not shown); and RF processing for efficiently propagating the up-converted baseband signal; and (j) over-the-air propagation device 395 (e.g., an antenna) for propagating the signal produced by processor 390 as delivered over path 391.

By way of relating the OFDM principles to the transmitter 300 of FIG. 3, it is instructive to couch the OFDM principles in terms of the elements of FIG. 3. Accordingly, the OFDM channel spectrum is subdivided into N independent narrow-band channels, and a N-point DFT is used to approximate the subchannel carrier frequencies. From Table 2, N can range from 60 to 90 for single timeslot operation, and up to 480 to 720 for multi-timeslot operation, depending upon the bandwidth, and the number of timeslots assigned to each user. K of the N subchannels carry data symbols that are associated with one timeslot, with the remainder of the subchannels carrying PAR symbols plus pilot symbols, if required. No more than one symbol can be assigned to each subchannel. For the single timeslot per user case, 120 (or 60 $\log_2 M$, if M>4) data bits are separated into 60 groups of $\log_2 M$ bits each of which is mapped into a complex symbol by modulator 320 and forwarded to IDFT processor 340 via inserter 330. The IDFT processor inputs are frequency domain samples that are scaled by the complex input symbols. The K-point IDFT processing converts the N complex frequency domain symbols into N complex time domain samples. These time domain samples, which appear on paths 341, . . . , 342, are further processed by PAR processor 350 before cyclic prefix inserter 360 adds an additional V samples to the input of parallel-to-serial converter 370. The conventional signal processing provided by shaping filer 380 and RF processor 390 prepare the time samples for over-the-air propagation.

Typical values for the parameters are as follows: N=72, K=60, PAR symbols=8, pilot symbols=4, and number of cyclic prefix symbols V=8.

Details of the Transmitter Illustrative Embodiment

Whereas certain of the elements of transmitter 300 are typically realized conventionally, such as IDFT processor 340, converter 370, shaping filter 380, and RF processor 390, additional description with respect to certain of the other elements is in order to fully elucidate the illustrative embodiment of the present invention; further details pertaining to these latter elements are now presented.

1.1) Serial-to-Parallel Converter 310

Converter 310 is depicted as a simple serial-to-parallel converter. However, it may be desirable in certain embodiments, depending upon system requirements, to expand the capabilities of converter 310 to include error correcting coding, such as forward error correction (FEC) encoding, prior to the conversion of serial input stream 310 to K parallel output streams 311, ..., 312.

1.2) Modulator 320

The modulation produced by modulator 320 is based upon a look-up table which is generated during the system design phase, that is, it is generated off-line rather than in real-time. The look-up table modulation procedure is composed of two steps, namely, the construction of, for the illustrative embodiment, a QAM constellation table, and then the use of the table to produce electrical signals indicative of constellation symbols which are emitted by modulator 320 over parallel paths 321, ..., 322.

The symbols are complex, that is, each symbol has an in-phase component and a quadrature component, which for expository purposes can be considered to be the real and imaginary part of a complex symbol. Generally, the complex symbols for a range of M-ary constellations are generated and stored in the table; in this way, the table is versatile enough to handle variable-rate systems wherein each of a plurality of channels can be associated with a different M-ary constellation (e.g., channel 1 may be 4-QAM, channel 2 may be 8-QAM, and so forth). However, the focus of the illustrative embodiment is on fixed-rate systems wherein all channels are M-QAM with M being fixed for all the channels. To access the M-QAM constellation of interest, two sets of indices are employed to address the memory locations; both indices are discussed in more detail shortly. The first index relates to the corresponding Gray-coded bits, and the second index is a label from a set of reduced constellation points.

The layout of the table gives a "minimum energy" set of constellations. Most importantly, the time necessary to produce an output symbol indicative of the input data, which results from a table search, is reduced by a factor of about one-half over conventional table look-up implementations.

Any range of M-QAM constellations can be implemented, but for exemplary purposes, the technique to generate the constellation points for the sequence of M=4, 8, 16, and 32 is presented.

1.2.1) Generation of the M-QAM Constellation Table

The algorithm to generate the constellation table (with a minimal energy constraint) and addresses for constellation points in the table is described by the following steps:

(1) define the set of points in the first quadrant of the M-QAM constellation as $S_M$, wherein the x and y coordinates of the points can take on only the values $x=\pm1, \pm3, \pm5, \ldots$ and $y=\pm1, \pm3, \pm5, \ldots$ (2) start with the 4-QAM constellation and label the point in $S_4$ having x and y coordinates as $P_0$, i.e., $P_0 \rightarrow (x,y)$.

Figure 4A:
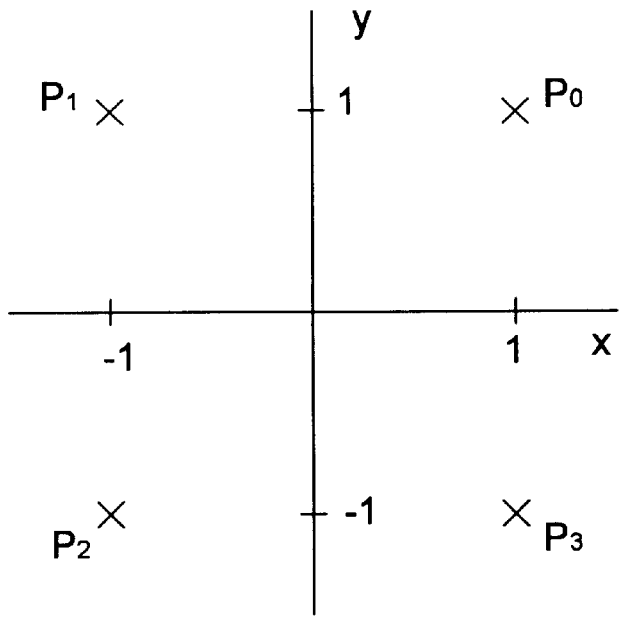
FIG. 4A depicts the constellation points $P_n$, n=1, 2, 3, and 4 for a minimal-energy 4-QAM constellation.

(3) move in a counter-clockwise direction and label the other three points to complete the 4-QAM constellation as $P_1 \rightarrow (-x,y)$, $P_2 \rightarrow (-x,-y)$, and $P_3 \rightarrow (x,-y)$. The depiction of FIG. 4A illustrates the location of these constellation points.

Figure 4B:
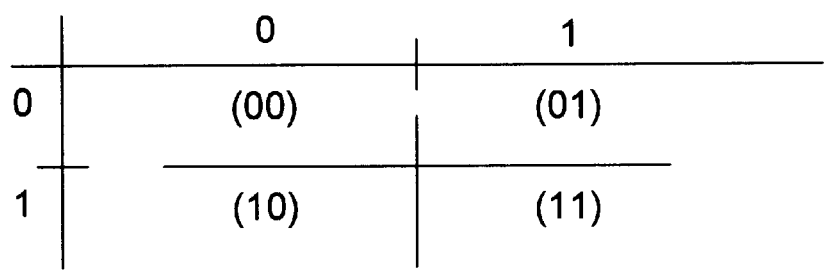
FIG. 4B depicts the construction of a 2-bit Gray code for association with the constellation points of FIG. 4A.

(4) assign codes to the 4-QAM constellation based on a Gray code assignment; a table for generating such a Gray code assignment is shown in FIG. 4B. The table of FIG. 4B is then mapped onto the constellation points of FIG. 4A to produce the constellation point-Gray code pairs of FIG. 4C, which summarizes the constellation points and their associated Gray codes. Thus $P_0$ has associated Gray code (01), $P_1$ has associated Gray code (00), $P_2$ is assigned (10), and $P_3$ is assigned (11). Moreover, for point $P_0$, the x-value or in-phase value is 0 and the y-value or quadrature value is 1; and similar relations for the other constellation points are readily identifiable. The Gray-coded bit values are used to produce the complex symbols in the constellation.

Figure 4C:
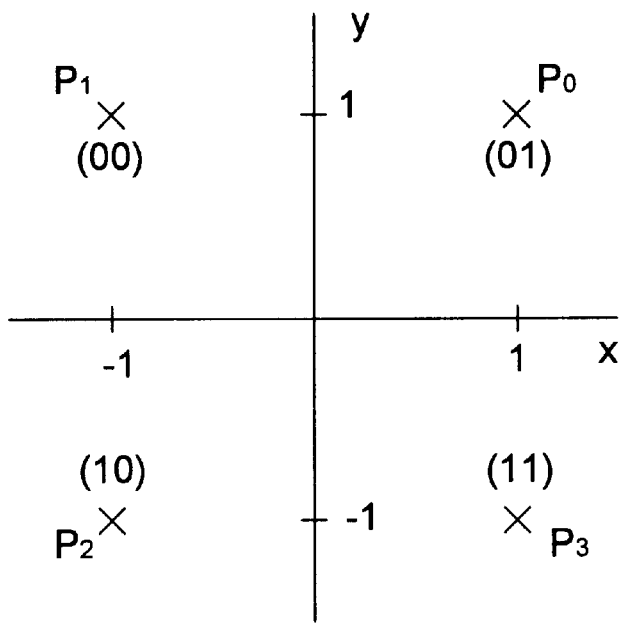
FIG. 4C depicts the association of the Gray code of FIG. 4B with the constellation points of FIG. 4A.

It is noted that the "energy" is generally defined as $E=x^2+y^2$, so for the 4-QAM constellation, E=2 for the signal level values shown in FIG. 4C. For instance, $P_0$ is located at (1,1), $P_1$ is located at (−1,1), and so forth, and each case $x^2+y^2=2$.

(5) labels for the 8-QAM and higher constellation points are determined in an iterative manner. Consider first the next point $P_k \rightarrow (x,y)$ in $S_M$ not already in $S_{M-1}$.
  (a) find the lowest energy point $x^2+y^2$ not in $S_{M-1}$.
  (b) if two or more points have equal energy, then
    (i) if the sums (x+y) for the points are equal, choose the point with the smallest y value
    (ii) if the sums are different, choose the point with the smallest max {x,y}
  (c) choose the three points associated with $P_k$ as $P_{k+1} \rightarrow (-x,y)$, $P_{k+2} \rightarrow (-x,-y)$, and $P_{k+3} \rightarrow (x,-Y)$ (6) repeat step (5) until there are M/4 points in $S_M$ (7) if the M-QAM constellation is square, and $2^L=M$, then assign Gray codes to the constellation points based on an L/2 Gray code assignment to the decomposed in-phase and quadrature components (8) if the M-QAM constellation is not square, then decompose it into the least number of contiguous square blocks, assign Gray codes to them based upon an int[L/2]-bit and {L−int[L/2]}-bit Gray code assignment. (Note that int[r] means integer division). If there are points in the constellation where Gray codes cannot be assigned, assign other codes that minimize the distance with neighboring points.

Figure 5:
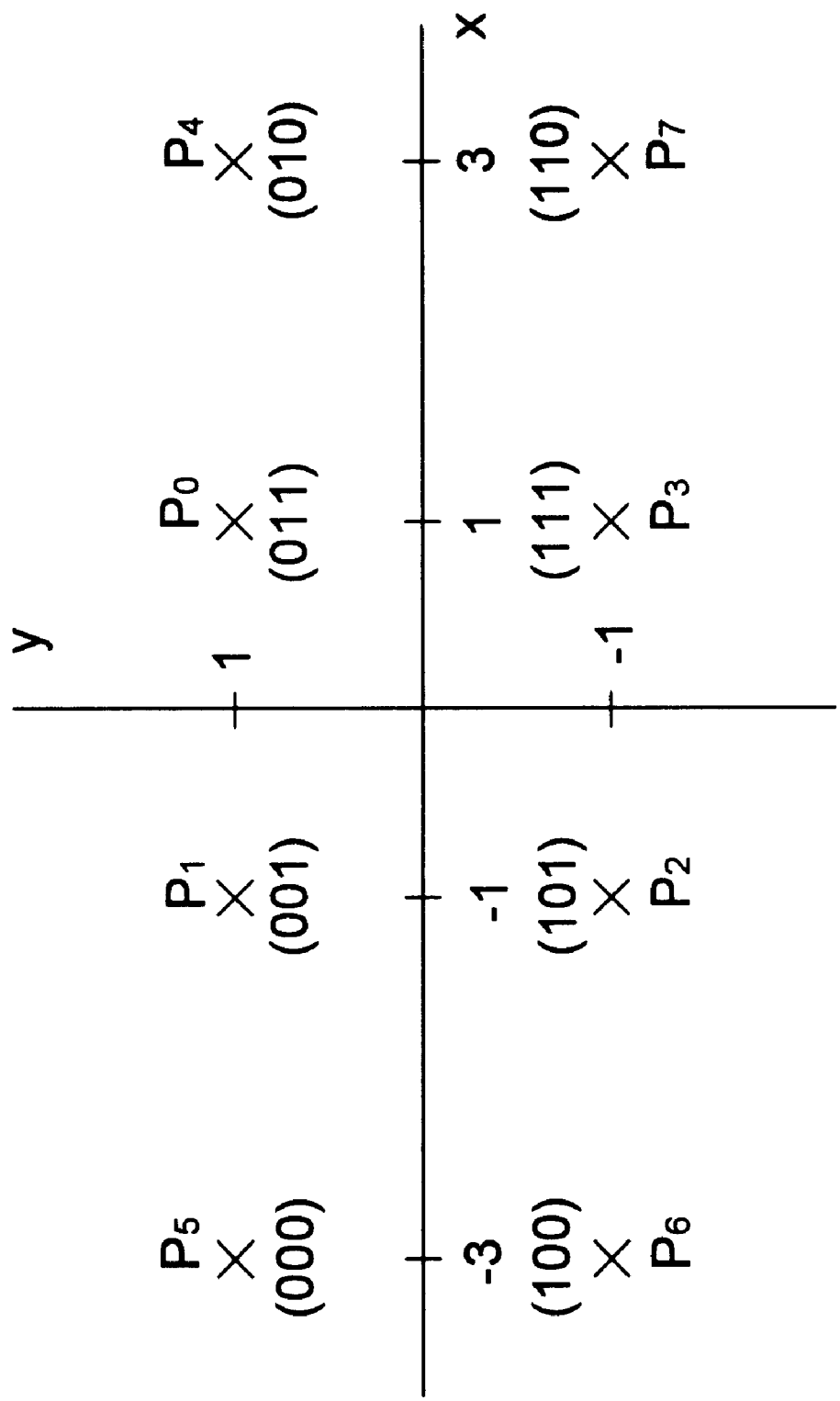
FIG. 5 depicts the constellation points and associated Gray code for an 8-QAM constellation.

The constellation points and labels for 8-QAM are shown in FIG. 5 based upon the above algorithm.

Figure 6:
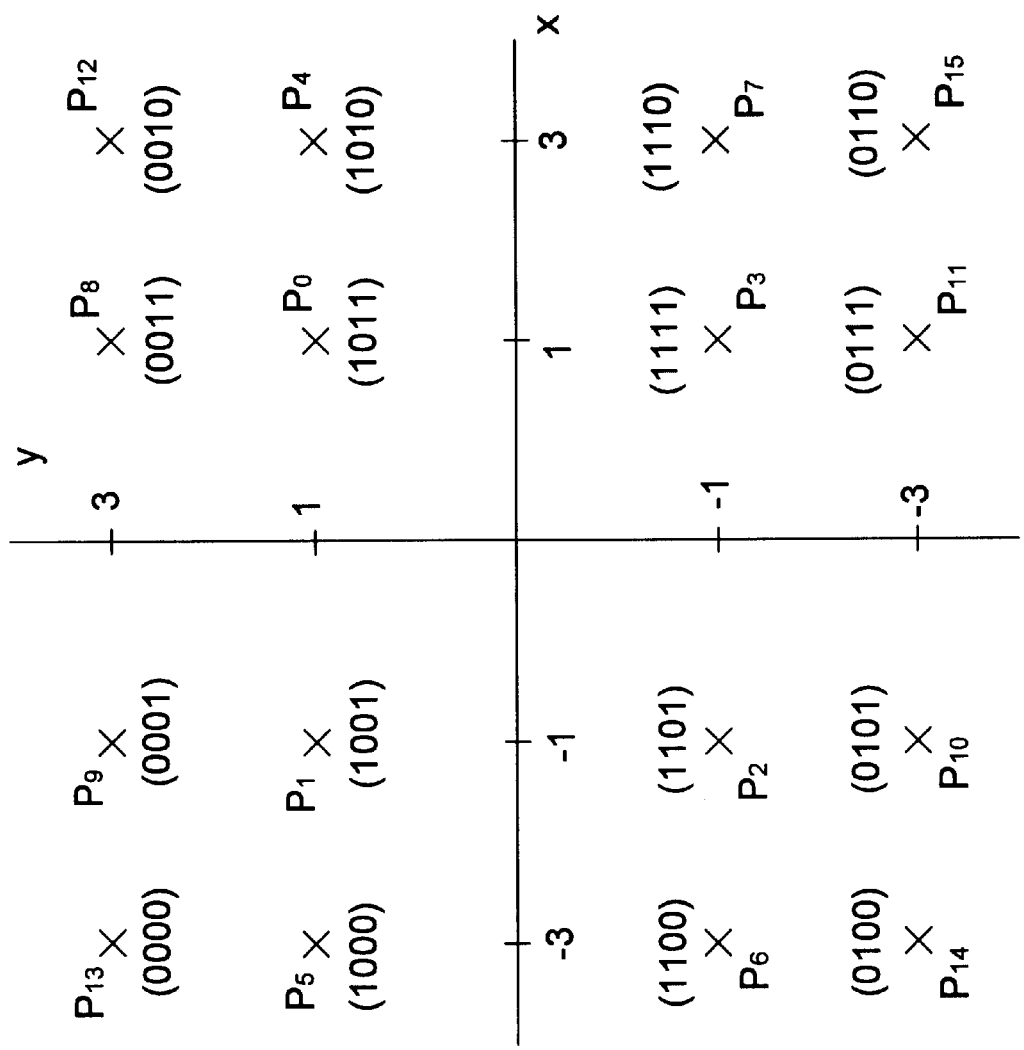
FIG. 6 depicts the constellation points and associated Gray code for a 16-QAM constellation.
Figure 7:
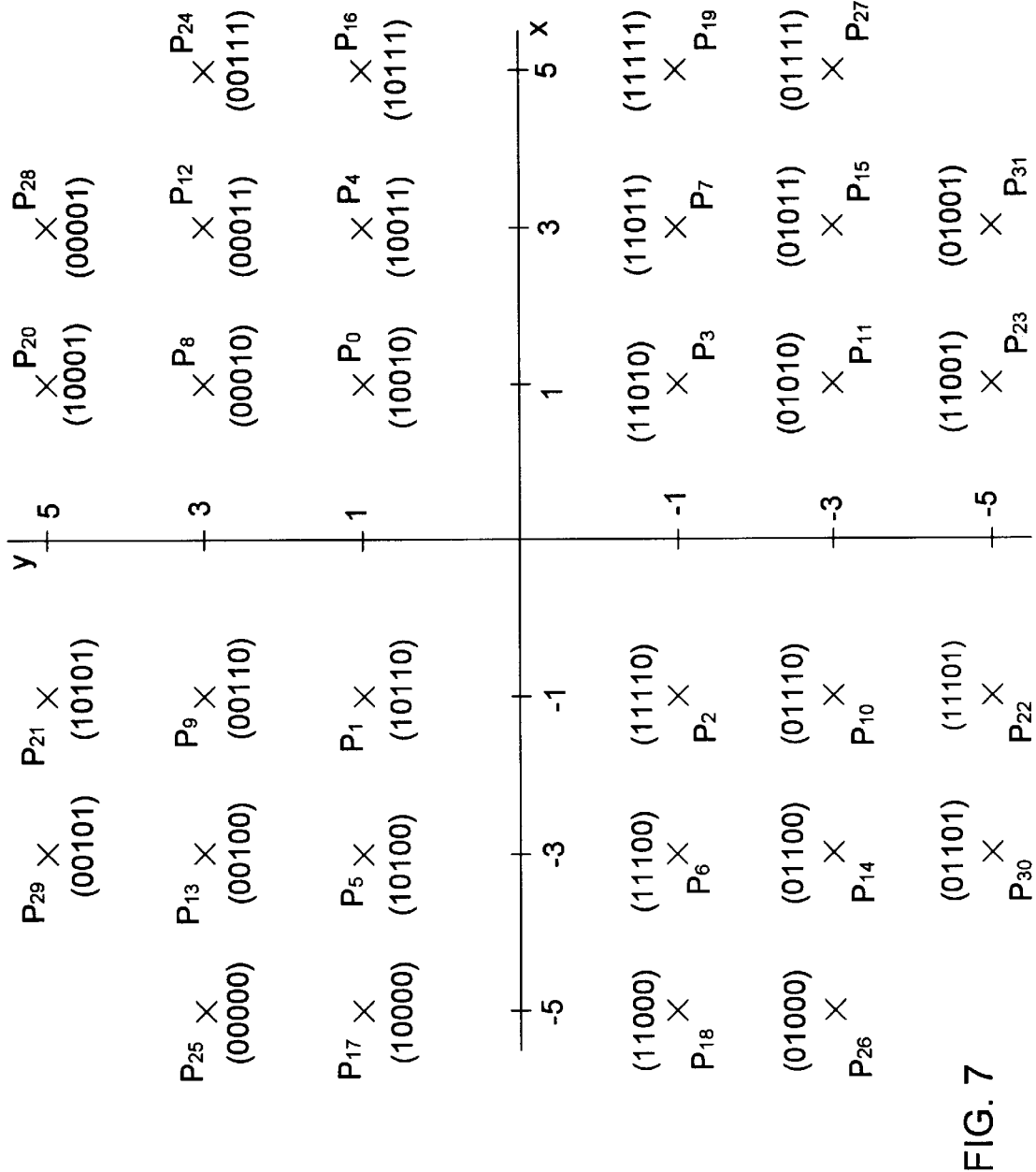
FIG. 7 depicts the constellation points and associated Gray code for a 32-QAM constellation.

Similarly, the constellation points and labels for 16-QAM and 32-QAM are shown in FIGS. 6 and 7, respectively. (It is noted that FIGS. 4C and 5 are to scale, but FIGS. 6 and 7 are not to exact scale, but suffice for expository purposes.)

It is readily contemplated for higher-level constellations that once the points in the first quadrant are generated, the points in the remaining quadrants are easily obtained by mapping.

Also, it is noted that the constellation points shown in FIGS. 4–7 are for un-normalized constellations. To obtain a M-QAM constellation with a peak value of A volts, each point in these constellations is scaled by $A/(\sqrt{M-1})$ for the square M-QAM constellation, and by A/3 and A/5 for 8-QAM and 32-QAM, respectively. It is further noted that each point in the constellation has two ways of being addressed, either by the Gray code label—which is different for each M-QAM constellation—, or by the point assignment number (e.g., $P_k$)—which is unchanged for lower constellations. It is clear that constellation tables for 64-QAM or higher can be constructed in a straightforward manner based upon the prior teachings. Finally, it is clear that the constellation can be rotated without affecting the information conveyed by the constellation points.

1.2.2) Generating Complex Symbols from Gray-Code Input

Figure 8A:
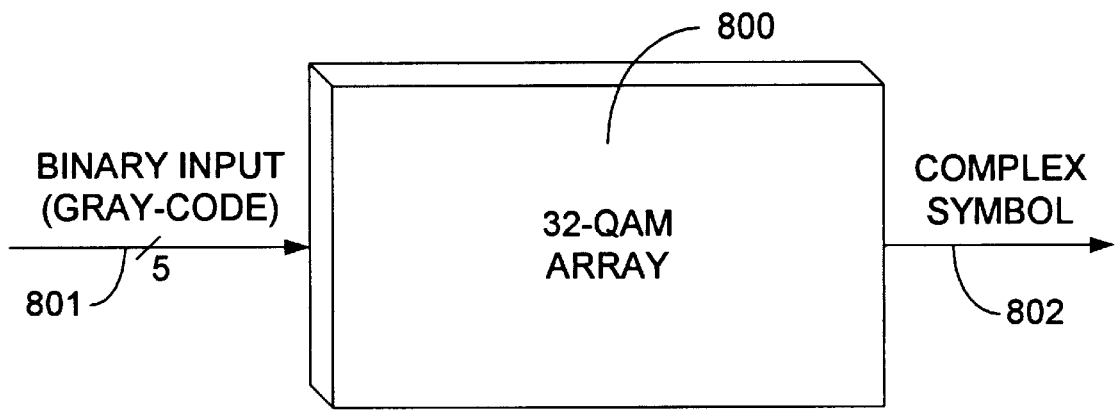
FIG. 8A depicts an exemplary constellation addressed by an input data stream to produce a complex symbol output for a fixed-rate modulator.

To use the look-up constellation of FIGS. 4C, 5, 6, or 7, each of the K-bit streams on each path 311, ..., 312 of FIG. 3 serves as an input to the appropriate look-up table, and a complex symbol is emitted on each of the K output paths 321, ..., 322 in correspondence to the input stream. For instance, suppose that the constellation of FIG. 7 serves as a complex symbol look-up table; this constellation is depicted as 32-QAM storage array 800 in FIG. 8A. Path 801 is representative of each path 311, ..., or 312 of FIG. 3. A 5-bit input stream arrives on path 801, and is used to address storage array 800 to generate the complex symbol corresponding to the 5-bit stream. As an example, if the binary input is (10100), then the complex symbol emitted is (−3,1) which corresponds to constellation point $P_5$.

It is noted that there are implementation alternatives to the table look-up technique depending upon the particular realization of modulator 320. For instance, it may be desirable to replicate QAM storage array 800 so that each path 311, 312, ... accesses a separate array 800; such an implementation is useful for a parallel processing realization. On the other hand, if the overall rate of complex symbol generation is significantly higher than the symbol communication rate, the table look-up may be implemented in software so that there is physically only one storage array 800 (e.g., a data array). In this case, the complex symbols may be produced via a multiplicity of table queries.

Figure 8B:
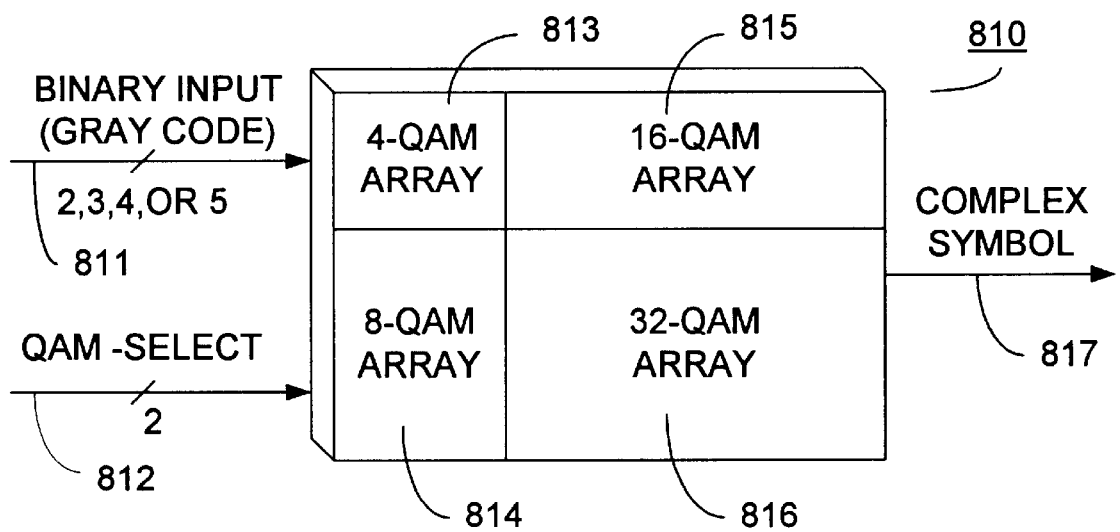
FIG. 8B depicts an exemplary set of constellations addressed by an input data stream and a QAM-select signal to produce a complex symbol output for a variable-rate modulator.

The realization of modulator 320 depicted in FIG. 8B is used for a variable-rate M-QAM implementation. For this case, storage array 810 is composed of the following sub-arrays: (i) storage area 813 that stores the 4-QAM array of FIG. 4C; (ii) storage area 814 that stores the 8-QAM array of FIG. 5; (iii) storage area 815 that stores the 16-QAM array of FIG. 6; and (iv) storage area 816 that stores the 32-QAM array of FIG. 7. Now there are two required inputs to storage array 810, namely, the binary input stream interpreted as a Gray-code appearing on path 811, and a QAM-select signal on path 812. The number of bits appearing on path 811 determines which sub-array is to be accessed; for example, a 4-bit stream on path 811 requires the use of area 815, which QAM select path 812 appropriately chooses. The complex symbol is emitted on path 817. Again, depending upon the implementation, array 810 may be replicated or be a single array, such as a data array.

1.3) PAR and Pilot Symbol Inserter 330

Null symbols are inserted in the subcarriers that are reserved for PAR reduction, specifically, the middle subcarriers corresponding to the high frequency components that will be attenuated by the transmit filter. PAR processor 350 will populate these subcarriers with their actual values.

Pilot symbols are used for both "Channel and SINR Estimation" and "Symbol Timing and Carrier Frequency Offset Estimation", which are discussed below when a receiver illustrative embodiment is presented. The pilots for the latter are inserted once every F blocks, where F could be on the order 8 or 16, to be synergistic with the PACS multi-frame (8 frames, 20 ms). For "Channel and SINR Estimation", the pilots can be any non-zero symbol; for exemplary purposes, the pilots are chosen to be the constellation point representing the number 1. For "Symbol Timing and Carrier Frequency Offset Estimation", the pilots are simply null symbols, i.e. 0. The block diagram of FIG. 9, which is a more detailed representation of inserter 330, shows an example with P=8 PAR reduction subcarriers and W=4 pilots with K=60; thus N=72.

Figure 9:
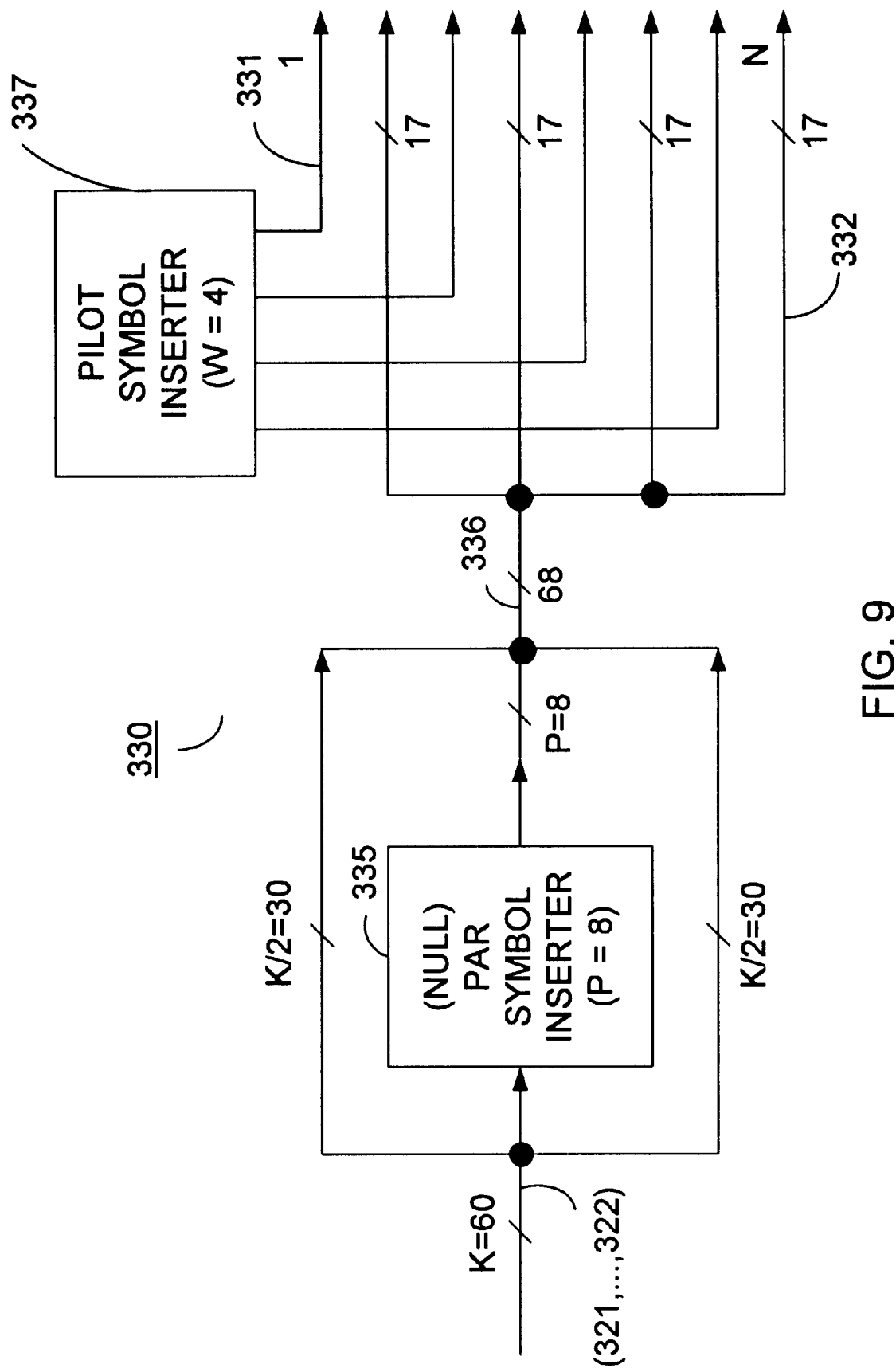
FIG. 9 depicts an illustrative embodiment of the PAR and pilot symbol inserter of is FIG. 3.

In FIG. 9, for exemplary purposes, it is assumed that K=60, and parallel paths 321, ..., 322 convey these K sets of input bits. The null PAR symbols are inserted symmetrically into these K parallel paths by inserter 335, that is, of the 68 parallel paths 336: the first 30 are derived from the K sets of input bits; the next eight are from inserter 336; and the remaining 30 derived from the rest of the K sets of input bits. Then pilot symbol inserter 337 inserts W pilot symbols symmetrically into the 68 sets of bits to derive the N parallel paths 331, ..., 332 shown repeated in FIG. 9. As depicted in FIG. 9, the N paths are derived as follows: the first path is associated with inserter 337; the next 17 paths are derived from path 326; the next path is associated with inserter 337; the next 17 paths are derived from path 326; and so forth.

1.4) Processing by PAR Processor 350

$$\text{Let } \psi(d_i) = \max_k \frac{|d_i(k)|^2}{\frac{1}{N}\sum_{i=0}^{N-1}|d_i(l)|^2} = \max_k \frac{|d_i(k)|^2}{\sigma^2}, \text{ where}$$

$d_i$ is a vector representing the N-symbol parallel output of the "N-Point Inverse DFT" processor 340, for the $i^{th}$ OFDM block passing through the transmitter.

Definitions:
  Define the following parameters:
  (i) C is the target maximum PAR
  (ii) P is the number of non-information-bearing subcarriers
  (iii) J is the size-P set of indices of subchannels that are non-information-bearing
  (iv) $\mu$ controls the speed of convergence.

Parameter Settings:
  Example parameter settings (with suggested range in parentheses):
  (i) C=7 dB (5 dB–9 dB)
  (ii) $\alpha$=3 (2–6)
  (iii) $\eta_0$=40 (10–40)
  (iv) $\mu$=4 (2–8)

Algorithm:
  1. Obtain $d_i$ from the output of "N-Point Inverse DFT" processor 340
  2. Set counter $\eta$=0. If $\psi(d_i)$<C, then algorithm is DONE. Otherwise, proceed to step 3.
  3. Pre-compute the following factors for $1\leq l\leq P$: $Y_l=e^{j2\pi J_{(l)/N}}$, where J(l) is the $l^{th}$ member of J.
  4. Find the largest $\alpha$ peaks and construct $b_i$ from these, using $$c_i(k) = \begin{cases} d_i(k) & \text{if sample } k \text{ is not one of the } a \text{ peaks} \\ C \arg(d_i(k)) & \text{if sample } k \text{ is one of the } a \text{ peaks} \end{cases}$$

and $$b_i(k) = d_i(k) - c_i(k)$$

5. Let the corresponding indices of the $\alpha$ largest peaks be $k_1, k_2, \ldots, k_a$. Compute the following update kernels for $1\leq l\leq P$:

$$\beta_l = Y_l^{-k_1} b k_{1+l} l^{-k_2} b_{k_2} + \ldots + Y_l^{-k_a} b_{k_a}$$

6. Update the vector $d_i$ by the following for $0\leq k\leq N-1$:

$$d_i(k) = [d_i(k)]_{previous\ iteration} - \frac{2\mu}{N^2}\sum_{l=1}^{P}Y_l^k B_l$$

7. Set counter $\eta=\eta+1$. If $\psi(d_i)$<C or $\eta=\eta_0$, then algorithm is DONE. Otherwise, return to step 4.

DONE: stop processing current block of data; use $d_i$ as the output of PAR processor 350 on paths 351, ..., 352.

1.5) Cyclic Prefix Inserter 360

As alluded to in the OFDM Principles Section above, deployment of the DFT results in each subchannel possessing a spectrum of non-negligible sidelobes. The sidelobes are mitigated by extending the data frame from N to N+V symbols by a cyclic prefix generated, for instance, by the appending the last V samples from the output of processor 340 to the symbols produced by PAR processor 350. For example, for the parameters used as exemplary, V=8 is a suitable choice. Thus, if N=72, and these seventy-two points appearing on paths 351, . . . , 352 are labeled 1, 2, . . . , V+1, V+1, V+2, . . . , N, then paths 361, . . . , 362 convey the symbols V+1, V+2, . . . , N. The input to converter 370 thus has eighty-nine symbols (identified by the labels 1, . . . , N+V) ordered as V+1, V+2, . . . , N, 1, 2, . . . V, V+1, V+2, . . . , N.

2.) Receiver 400

Before presenting the arrangement of elements composing an illustrative embodiment of receiver 400, it is instructive to first present an overview discussion of the operational principles of receiver 400, and the reason why certain processing capabilities are required in receiver 400.

Figure 10:
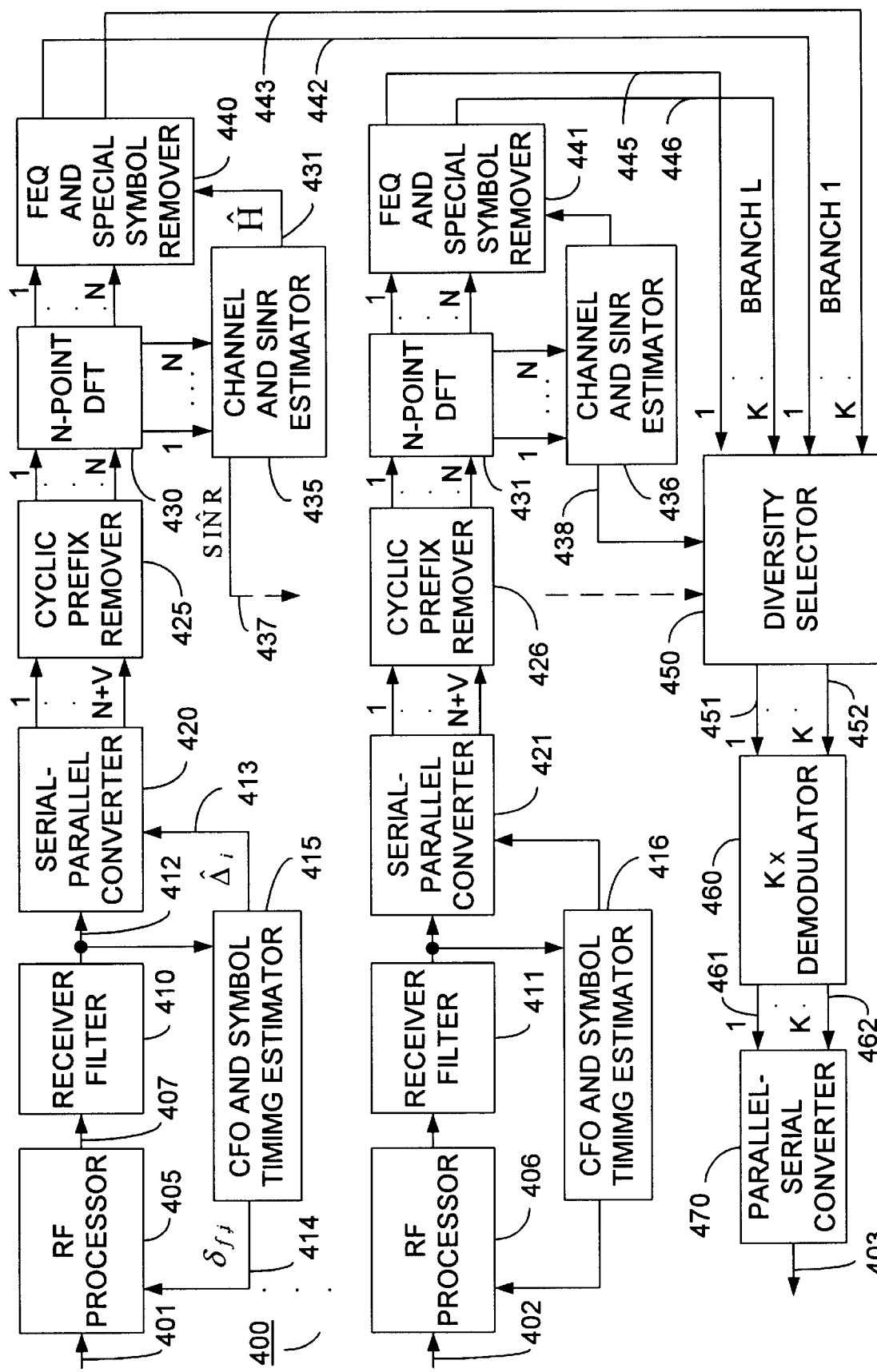
FIG. 10 is an illustrative embodiment of a receiver as a high-level block diagram in accordance with the present invention.

The transmission channel or wireless path between transmitter 300 of FIG. 3 and receiver 400 of FIG. 10 distorts the transmit signal, impairs the orthogonality of the subchannels, and introduces interchannel/intersymbol interference. An L-branch (e.g., L=2) diversity combining technique is exploited to improve the error-rate performance of the MPACS receiver 400. There are numerous well-known diversity combining techniques that offer a tradeoff between performance and complexity. For instance, maximal ratio combining yields the largest possible improvement that any diversity systems can produce over fading channels. Antenna diversity combining may also be implemented to further improve performance.

After signal filtering at the front-end of receiver 400, and removal of the cyclic prefix as discussed in more detail shortly, each of the outputs of L diversity branches is converted to parallel format by a serial-to-parallel converter and then processed by an N-point DFT. The frequency domain PAR symbols and pilot symbols (if any) are removed before DFT outputs from each of the L branches are combined, or one of the L branches is selected. The sequence of K symbols are then demodulated, decoded if necessary, and then converted from a parallel incoming to a serial outgoing bit stream. The pilot symbols are used for carrier recovery and coherent detection. A simple look-up table technique is used for demodulation; the table is essentially a replicated version of the table of modulator 320 in transmitter 300. In addition, a hybrid symbol timing and carrier frequency offset estimation technique is used in receiver 400.

A high-level block diagram of receiver 400 in accordance with the present invention is shown in FIG. 10. Receiver 400 is configured for the general case of detecting the over-the-air transmission from transmitter 300 via plurality of processing paths for "diversity reception", that is, each receiver 400 may be arranged with a plurality of receiving paths 401, . . . , 402 (e.g., receiving antennas) to detect the propagating RF signal from transmitter 300. At the front-end of receiver 400, a plurality of essentially identical parallel paths process the incoming signal detected by each corresponding antenna. The results of the processing by the parallel paths are then combined in down-stream circuitry to produce the "best" received signal, as will be discussed in more detail shortly.

A representative one of the front-end processing paths, as associated with antenna 401, includes: (a) RF processor 405, responsive to antenna 401, for generally effecting the inverse of the functions performed by RF processor 390 of transmitter 300 (of particular relevance is the existence of a receiver local oscillator that nominally operates at the frequency of the transmitter local oscillator; however, to ensure proper reception of the symbols emitted by transmitter 300, techniques to control the receiver local oscillator are necessitated in the receiver, as set forth in detail shortly); (b) receiving filter 410, responsive to RF processor 405, for filtering the signal received from processor 405 over path 407; (c) serial-to-parallel converter 420, responsive to the serial stream of bits on path 412 from filter 410, for converting such serial stream to N+V parallel paths conveying N+V symbols, respectively, which are the received counterparts to N+V symbols at the input to converter 370 of transmitter 300; (d) symbol timing and Carrier Frequency Offset (CFO) estimator 415, responsive to the signal on path 412, for controlling symbol timing and CFO estimation in processor 405 as well as in converter 420, as discussed in more detail shortly; (e) cyclic prefix remover 425, responsive to converter 420, for removing the prefix symbols introduced by inserter 360 of transmitter 300 to thereby produce N output symbols from the N+V incoming symbols; (f) N-point DFT transform processor 430, responsive to remover 425, for computing the Discrete Fourier Transform on the N incoming symbols; (g) frequency domain equalizer (FEQ) and special symbol remover 440, responsive to processor 430, the function of which is discussed in more detail below; and (h) channel and SINR estimator 435, also responsive to processor 430, the function of which is discussed in more detail below.

A second diversity path that has elements and operates in essentially the same manner as the above-described path includes the following elements identified by their associated reference numerals along with the reference numerals of the corresponding elements from the first path, in parenthesis: RF processor 406 (RF processor 405); receiver filter 411 (filter 410); symbol timer and CFO estimator 416 (estimator 415); converter 421 (converter 420); cyclic prefix remover 426 (remover 425); N-point DFT processor 431 (processor 430); estimator 436 (estimator 435); and FEQ and special symbol remover 441 (remover 440).

At this point in the processing by receiver 400, each of the L diversity branches outputs K symbols, as depicted by the K symbols on paths 442, . . . , 443 for the first diversity path, and paths 445, . . . , 446 for the branch L or the $L^{th}$ diversity path. The L parallel sets of K symbols serve as an input to diversity selector 450; in addition, selector 450 has as inputs the outputs of channel estimators 435, . . . , 436 on leads 437 . . . , 438, respectively. Diversity selector 450 selects one of the branches as providing the "best" signal for detection and provides the K symbols for the selected branch on paths 451, . . . , 452. The "best" signal may utilize, for instance, signal-to-noise ratio computations. The chosen symbol set of K symbols then serves as input to demodulator 460, which performs the obverse functions of modulator 320 of FIG. 3. Demodulation is effected by a table look-up procedure wherein the real and imaginary coordinates of each complex symbol is located in the table and the code associated with each such complex symbol is outputted from demodulator 460 as a parallel stream of bits on K paths 461, . . . ,462. The final step in the processing is to convert the K parallel streams into a serial output stream; this is accomplished by parallel-to-serial converter 470, and the output bit stream on output path 403 is the detected counterpart to input bit stream 310 of transmitter 300.

Details of the Receiver Illustrative Embodiment

Whereas certain of the elements of receiver 400 are typically realized conventionally, such as RF processors 405 and 406, filters 410 and 411, converters 420 and 421, cyclic prefix removers 425 and 426, DFT processors 430 and 431, and converter 470, additional description with respect to certain of the other elements is in order to fully elucidate the illustrative embodiment of the present invention; further details pertaining to these latter elements are now presented.

Figure 11:
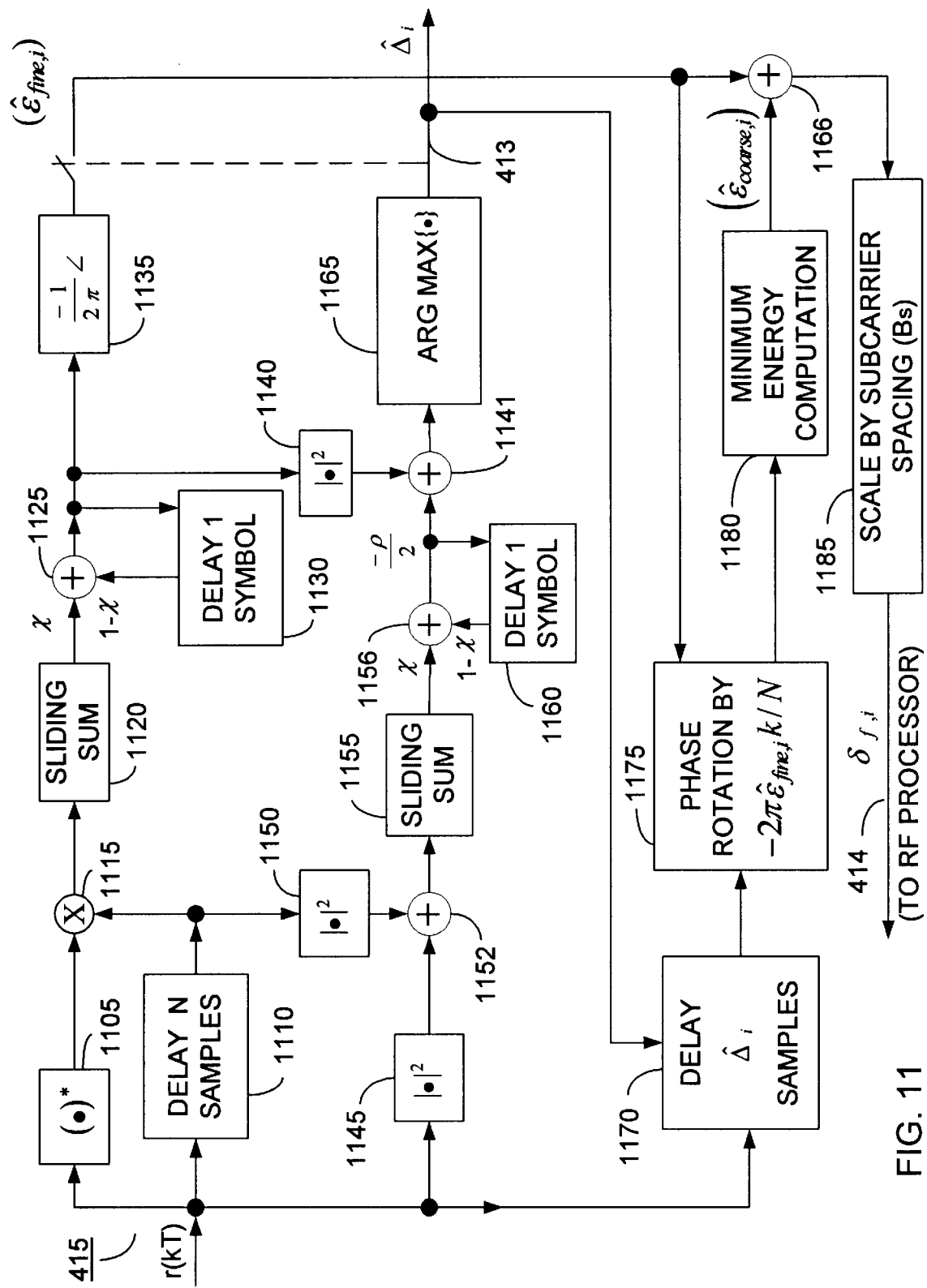
FIG. 11 is illustrative of the symbol timing and carrier frequency offset estimator of FIG. 10.

2.1) Symbol Timing and CFO Estimation by Estimator 415 (see FIG. 11)

Symbol timing recovery and fine CFO estimation rely on the correlation properties of the cyclic prefix. Coarse CFO estimation makes use of known pilot symbols.

Definitions:

1. $1-\chi$ is a "forgetting factor", weighting contributions to the symbol timing and fine CFO estimates from previous processing blocks of FIG. 11
2. $\rho$ is a correlation coefficient
3. $\Xi$ is the number of OFDM blocks (including the present one) to be included in the symbol timing and fine CFO recovery.
4. $\hat{\epsilon}_{coarse,i}$ and $\hat{\Delta}_i$ are integer-valued offset estimates, of coarse CFO and of symbol timing, respectively. $\hat{\epsilon}_{fine,i}$ is a fractional (CFO) offset estimate. $\hat{\epsilon}_{coarse,i}$ and $\hat{\epsilon}_{fine,i}$ are normalized to the subcarrier bandwidth.
5. $B_s$ is the (known) subcarrier bandwidth.
6. $\delta_{f,i}$ is the estimated CFO, where $\delta_{f,i}=B_S(\hat{\epsilon}_{coarse,i}+\hat{\epsilon}_{fine,i})$
7. W is the number of pilot symbols, and V is the number of (regular, either data or PAR) subchannels between consecutive pilots.
8. s(k) are the discrete-time samples using the recovered timing offset and fine CFO offset, obtained from r(kT) as explained in the Algorithm description below.

Parameter Settings:

Example parameter settings (with suggested range in parentheses):

1. $\chi=0.7(0.5-0.9)$
2. 
$$\rho = \frac{SNR}{SNR+1}$$

where SNR is the average signal-to-noise ration of the subchannels in that branch, obtained from channel estimator 435, . . . , 436, depending upon the particular diversity branch 3. $\Xi=5$ (1–10)
4. W=4, V=17

Algorithm:

PART ONE: Timing Offset and Fine CFO Estimation and Recovery

1. Compute $$\Lambda_{i,1}(\Delta, \varepsilon) = \sum_{k=\Delta}^{\Delta+\nu-1} r(kT)r^*((k+N)T),$$

as computed by processing elements 1105, 1110, and 1115 of FIG. 11; also, compute $$\Lambda_{i,2}(\Delta, \varepsilon) = \sum_{k=\Delta}^{\Delta+\nu-1} |r(kT)|^2 + |r((k+N)T)|^2,$$

as computed by processing elements 1110, 1145, 1150 and 1152 of FIG. 11. The 'i' in the subscript is the block index.

2. The timing estimate (for the ith block) is $$\hat{\Delta}_i = \arg\max_\Delta \left( \left| \sum_{\xi=0}^{\Xi} \Lambda_{i-\xi,1}(\Delta, \varepsilon)(1-\chi)^\xi \right| - \frac{\rho}{2} \sum_{\xi=0}^{\Xi} \Lambda_{i-\xi,2}(\Delta, \varepsilon)(1-\chi)^\xi \right),$$

as further obtained by the processing effected by elements 1155, 1156, 1160, 1120, 1125, 1130, 1140, 1141, and 1165

3. Using the timing estimate $\hat{\Delta}_i$, the fine CFO estimate $$\hat{\varepsilon}_{fine,i} = -\frac{1}{2\pi} \angle \left( \sum_{\xi=0}^{\Xi} \Lambda_{i-\xi,1}(\hat{\Delta}_i, \varepsilon)(1-\chi)^\xi \right),$$

as further obtained by the processing effected by elements 1120, 1125, 1130, and 1135.

PART TWO: Coarse CFO Estimation and Recovery (Elements 1170, 1175, 1180, 1166, 11851).

1. $s(k)=r((k+\hat{\Delta}_i)T)e^{-j2\pi\hat{\epsilon}_{fine,i}(k+\hat{\Delta}_i)/N}$—delayed by timing offset estimate, then rotated $-2\pi\hat{\epsilon}_{fine,i}k/N$
2. For a reasonable range of expected coarse CFO (e.g. +/−5 subchannel spacings, $\epsilon=-5,-4, \ldots, 4,5$), compute the metric $$F(\varepsilon) = \sum_{n=0}^{W-1} \left| \sum_{k_2=0}^{W-1} \left[ \left( \sum_{k_1=0}^{V-1} s(k_1 W + k_2)e^{-j2\pi\varepsilon n_1/V} \right) e^{-j2\pi\varepsilon k_2/N} \right] e^{-j2\pi n k_2/W} \right|^2.$$

(The coarse CFO estimator can estimate coarse CFO only up to $\pm V/2$. Since V=17 in the example, the maximum range is ±8. However, the design specification for receiver 400 requires that a local oscillator is sufficiently precise that the magnitude of the CFO is upper-bounded by 4, allowing the search to be limited to a range of ±5.)

Figure 12:
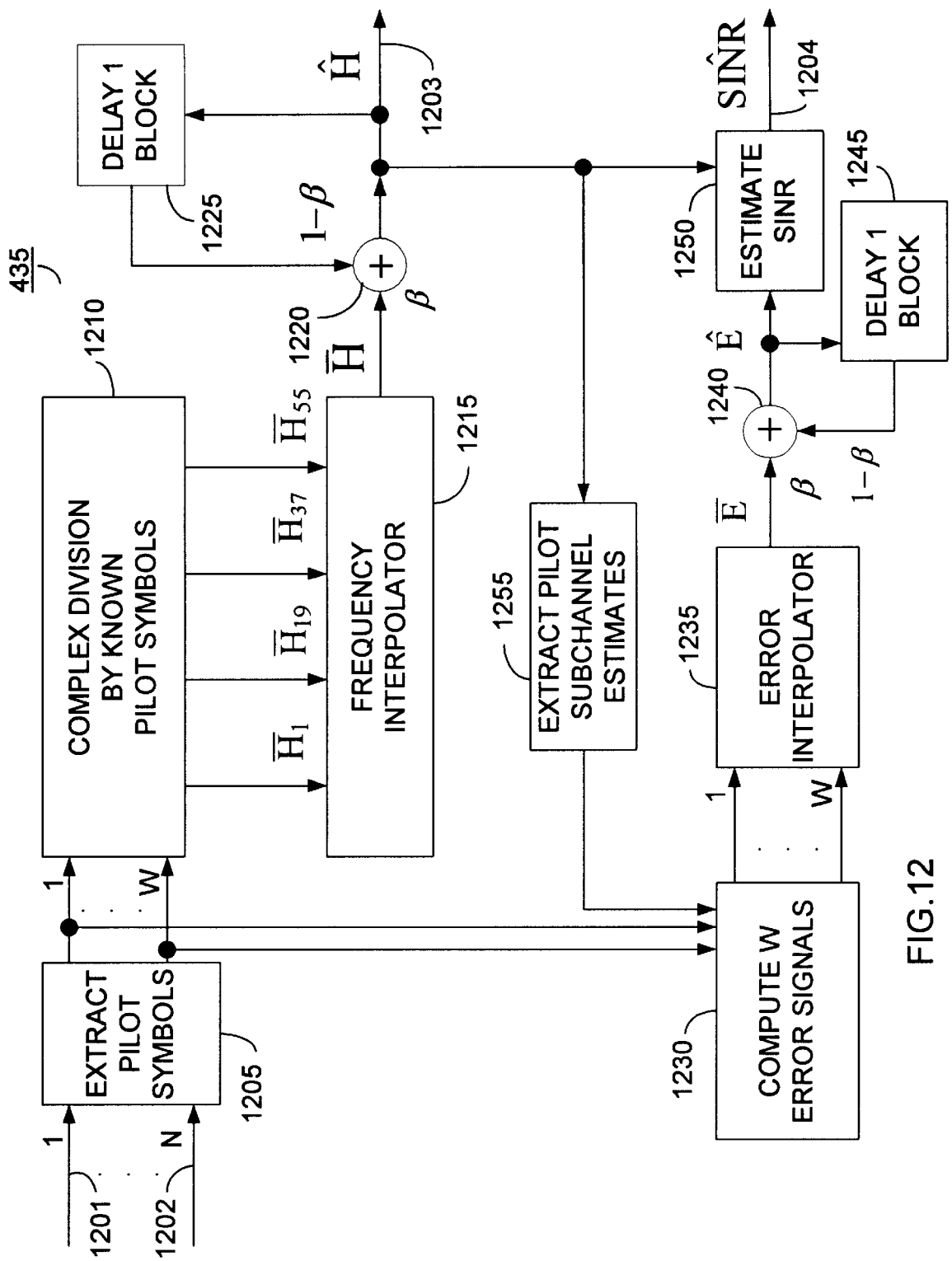
FIG. 12 is illustrative of the channel estimator of FIG. 10.

3. Pick $\epsilon_{coarse,i}=\arg_\epsilon\min F(\epsilon)$ 2.2) Channel and SINR Estimation by Estimator 435 (see FIG. 12)

Definitions:

1. $\overline{H}_n$ is the channel estimate for subcarrier n based only on the current block, and $\overline{H}$ is the length-N vector representing the channel estimate for all N subcarriers, based only on the current block. $\hat{H}$ is the corresponding vector representing the channel estimate for all N subcarriers, based on a weighted average of current and preceding blocks.
2. $1-\epsilon$ is a forgetting factor controlling the influence of the previous blocks on the current estimates Parameter Settings:

1. $\beta=0.7$ (0.5–0.9)

Algorithm:

1. Pilot symbols are extracted by element 1205 from N paths 1201, . . . , 1202. Since the pilot symbols have been scaled and rotated by the channel, a complex-number division via element 1210 by the known original pilot symbols is used to estimate the channel for the pilot subchannels.
2. "Frequency Interpolator" 1215 shall use standard interpolation techniques to interpolate the estimates to a set of estimates for all subchannels.
3. Estimates from previous blocks, via blocks 1220 and 1225, are factored in with a forgetting factor, to provide the final estimate.

SINR (Signal-to-Interference Noise Ratio) Estimation

Definitions:
1. $\overline{E}$ is the length-N vector representing the SINR estimate for all N-subcarriers, based on the current received pilots and $\overline{H}$. $\overline{\overline{E}}$ is the corresponding vector based on a weighted average of current and preceding blocks.
2. $1-\beta$ is a forgetting factor controlling the influence of the previous blocks on the current estimates Algorithm:
1. Starting with the channel estimates, "Compute W Error Signals" processor 123 computes the W error signals as follows: $E_n = R_n - \hat{H}_n A_n$, where $R_n$ is the symbol received on the nth subcarrier ($n^{th}$ output of the DFI), and $A_n$ is the corresponding known pilot symbol as provided by element 1255.
2. "Error Interpolator" element 1235 uses standard interpolation techniques to interpolate the error estimate for all subchannels with inputs from element 1230.
3. "Estimate SINR" element 1250 computes $\hat{SINR}_n = |H''|^2/|E_n|^2$ in conjunction with delay block 1245 and summer 1240

It is noted that the foregoing technique for SINR is merely exemplary; other techniques are also possible, and is an implementation detail not within the purview of the present invention.

Figure 13:
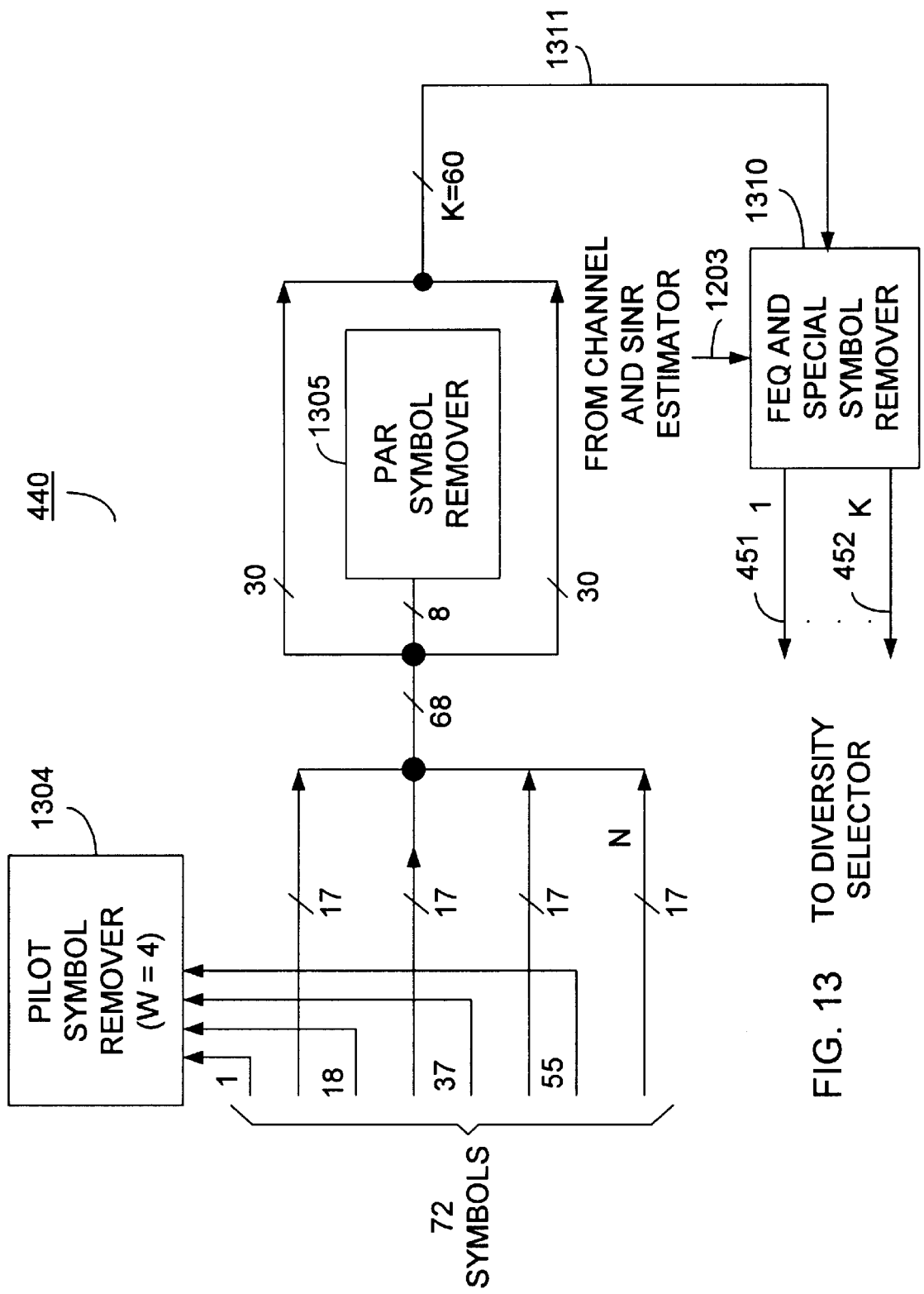
FIG. 13 is illustrative of the frequency domain equalizer and special symbol remover of FIG. 10.

2.3) FEO (Frequency-Domain Equalizer) and Special Symbol Remover 440 (see FIGS. 12 and 13)
Definitions:
1. $H_n$ is the channel response for the nth subchannel (estimated by "Channel and SINR Estimation" estimator 435 of FIG. 12, as appearing on lead 1203—which is equivalent to lead 431 for Branch 1 of FIG. 10)
2. $SINR_n$ is the SINR of the $n^{th}$ subchannel (estimated by "Channel and SINR Estimation" estimator 435 of FIG. 12, as appearing on lead 1204—which is equivalent to lead 437 of Branch 1 of FIG. 10)
3. $G_n$ is the one-tap equalizer for the nth subchannel, e.g. the one-tap MMSE equalizer defined by $$G_n = \frac{H_n^*}{|H_n|^2 + 1/SINR_n}$$

4. $\hat{D}_{n,l}$ refers to the equalized output of this functional block, where l is used in the subscript to explicitly refer to the branch number (between 1 and L) in preparation for "Diversity Selection" by selector 450

Algorithm:
1. Remove PAR and pilot symbols by processing effected by element 1304 and elements 1305, respectively
2. Equalize the remaining subchannels using $G_n$ in FEQ element 1310.

2.4) Diversity Selector 450

Branch diversity can be an effective means of reducing the degrading effects of interference, such as inter-channel interference. There are a variety of diversity techniques that offer a trade-off between performance and complexity. A discussion of representative techniques is presented in an article entitled "Comparison of Diversity Combining Techniques for Rayleigh-Fading Channels" by T. Eng et al., as published in the IEEE Transactions of Communications, Vol. 44, No. 9, pp. 1117–1129, September, 1996. One exemplary technique for the illustrative embodiment is as follows:
Definitions:
1. $\hat{D}_n$ refers to the output of selector 450.
2. $\hat{D}_{n,l}$ refers to the input to selector 450 for the $n^{th}$ subchannel from the $L^{th}$ branch Algorithm:
1. Compare $SINR_1$ for all the L branches and pick the branch with the largest, e.g. branch l'.
2. Set $\hat{D}_1 = \hat{D}_{1,l'}$
3. Repeat for subchannels 2 through K 2.5) Demodulation by Demodulator 460

The same look-up table generated off-line and stored in modulator 320 of FIG. 3 is replicated and stored in demodulator 460. Thus, in one case, the appropriate constellation depicted in FIG. 4C, 5, 6, or 7, depending upon the M-QAM selected, is stored in demodulator 460. In the alternative for a variable rate case, all constellations of interest would be stored in demodulator 460 and the particular constellation addressed would be accomplished via a QAM-select signal. Each of these cases was described with respect to FIGS. 8A and 8B for modulation, and a similar description applies now to the case of demodulation.

For demodulation, consider the constellation points being labeled as $P_{4k+n}$ for k=0, 1, ..., M/4, and n=0, 1, 2, 3. As an example of this notation, if k=0, then the constellation points under consideration are those in the first quadrant of FIGS. 4C, 5, 6 or 7, where the x and y axis define Cartesian axes. The constellation points $P_{4k+n}$ are used in the demodulator search algorithm to find the complex symbol in the constellation that is closest the to demodulated symbol that appears on paths 451, ..., 452; each such symbol is referred to as the "detected" complex symbol. Moreover, each detected complex symbol is treated independently of any other detected complex symbol to effect demodulation, but the search algorithm to convert each detected complex symbol to a corresponding stream of output bits is the same, as now described:

(a) first, rotate the detected complex symbol, denoted as $c_k \rightarrow (x_k, y_k)$, into the first quadrant and search M/4 locations for the constellation point that yields the "minimum distance" computation defined as follows:

$$\min\{(x-|x_k|)^2+(y-|y_k|)^2\},$$

where $P_{4k} \rightarrow (x,y)$ for k=0, 1, 2, ..., M/4. Suppose the k-value yielding the minimum is denoted m.

(b) next, search over the four quadrants via the four locations $P_{4m+n}$ for n=0, 1, 2, 3 and locate the constellation point that gives the minimum distance between $c_k \rightarrow (x_k, y_k)$ and the complex symbols at the four locations.

(c) finally, map the $P_{4m+n}$ location to the (Gray) coded bits corresponding to the complex symbol closest to the detected complex symbol.

As an example of this algorithm, suppose the detected complex symbol arriving on path 451 is (−0.5, 0.75) and 32-QAM is the given modulation. From FIG. 7, using step (a) of the demodulation algorithm and the coordinates of the detected symbol, it is evident that the point $P_0$ is closest to the detected symbol based upon the minimum distance computation. Now, according to step (b), besides $P_0$, only the points $P_1$, $P_2$, $P_3$ need to be investigated to determine which point yields the minimum distance. Again, it is clear that point $P_1$ yields the minimum distance. Finally, according to step (c), the Gray code associated with the located complex symbol is (10110), which becomes the stream of output bits emitted on path 461 for the detected complex symbol arriving on path 451.

It is instructive to compare the demodulation algorithm with the straightforward or "brute force" manner of locating the constellation point nearest to the detected complex symbol. With the straightforward approach, thirty-two minimum distance type computations would be needed for 32-QAM. On the other hand, using the demodulation algorithm described above, only eight computations are needed in step (a), and only four additional computations are required to complete step (b), for a total of twelve computations. This reduced number of computations (12 versus 32) speeds up the demodulation process. As the level of M-QAM increases, the efficiency becomes even more apparent.

Figure 14:
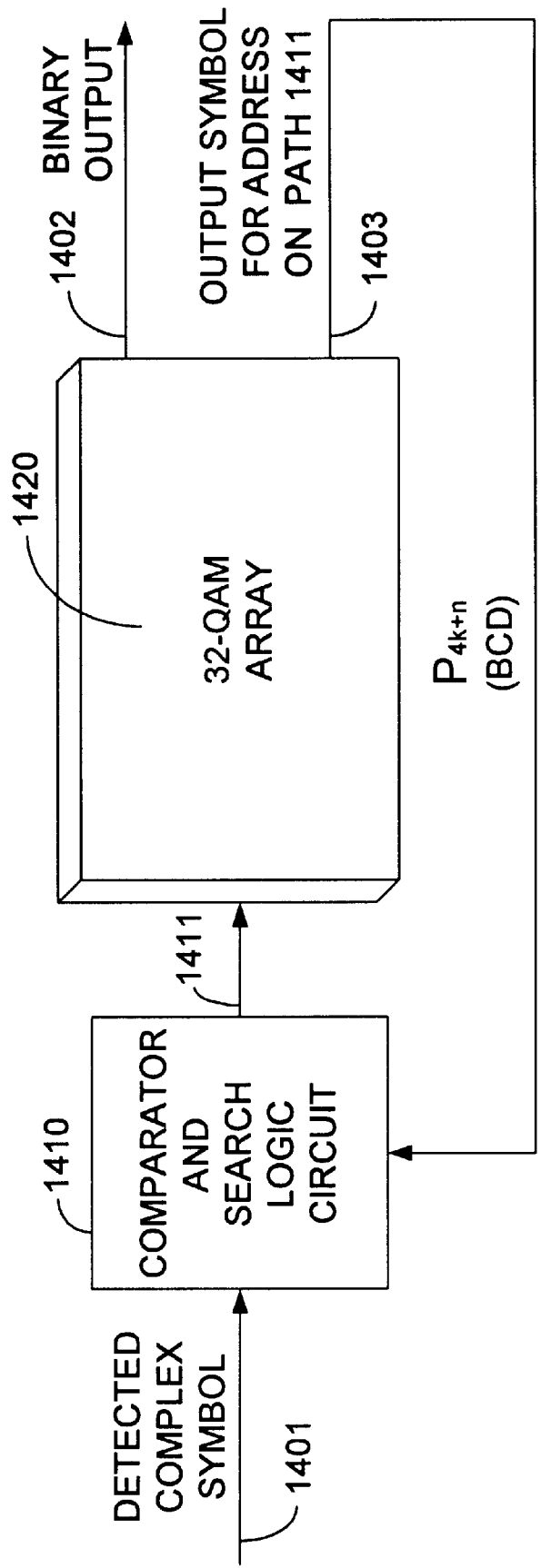
FIG. 14 is illustrative of the demodulator of FIG. 10 using a table-look up algorithm.

The block diagram of FIG. 14 illustrates an arrangement of elements to effect the demodulation process. The detected complex symbol arrives on path 1401, with is representative of any of the paths 451, ..., 452. Comparator and search logic circuit 1410 carries out steps (a)–(c) above of the demodulation algorithm. Lead 1411 from circuit 1410 is an address lead for accessing constellation points within look-up table 1420, which is 32-QAM for exemplary purposes. Based upon the address information on lead 1411, an output symbol corresponding to the address is emitted on path 1403 and serves as an input to circuit 1410. The minimum distance computations are carried out on each symbol provided by path 1403. As a result of the computations completed by circuit 1410, the last address provided on lead 1411 is the location of the constellation point nearest the detected symbol arriving on path 1401; this last address causes device 1420 to emit the stream of output bits corresponding to the Gray code associated with the constellation point nearest the detected symbol on path 1402, which is representative of any path 461, ..., 462.

2.6) Parallel-to-Serial Converter 470

Converter 470 is depicted as a simple parallel-to-serial converter. However, if converter 310 of FIG. 3 employs encoding techniques, such as forward error correction (FEC) encoding, it is necessary to augment converter 470 with FEC decoding capability, commensurate with the encoding of converter 310, prior to the conversion of parallel streams on K paths 461, ..., 462 to serial output stream 403.

Flow Diagrams

Transmitter 300

Figure 15:
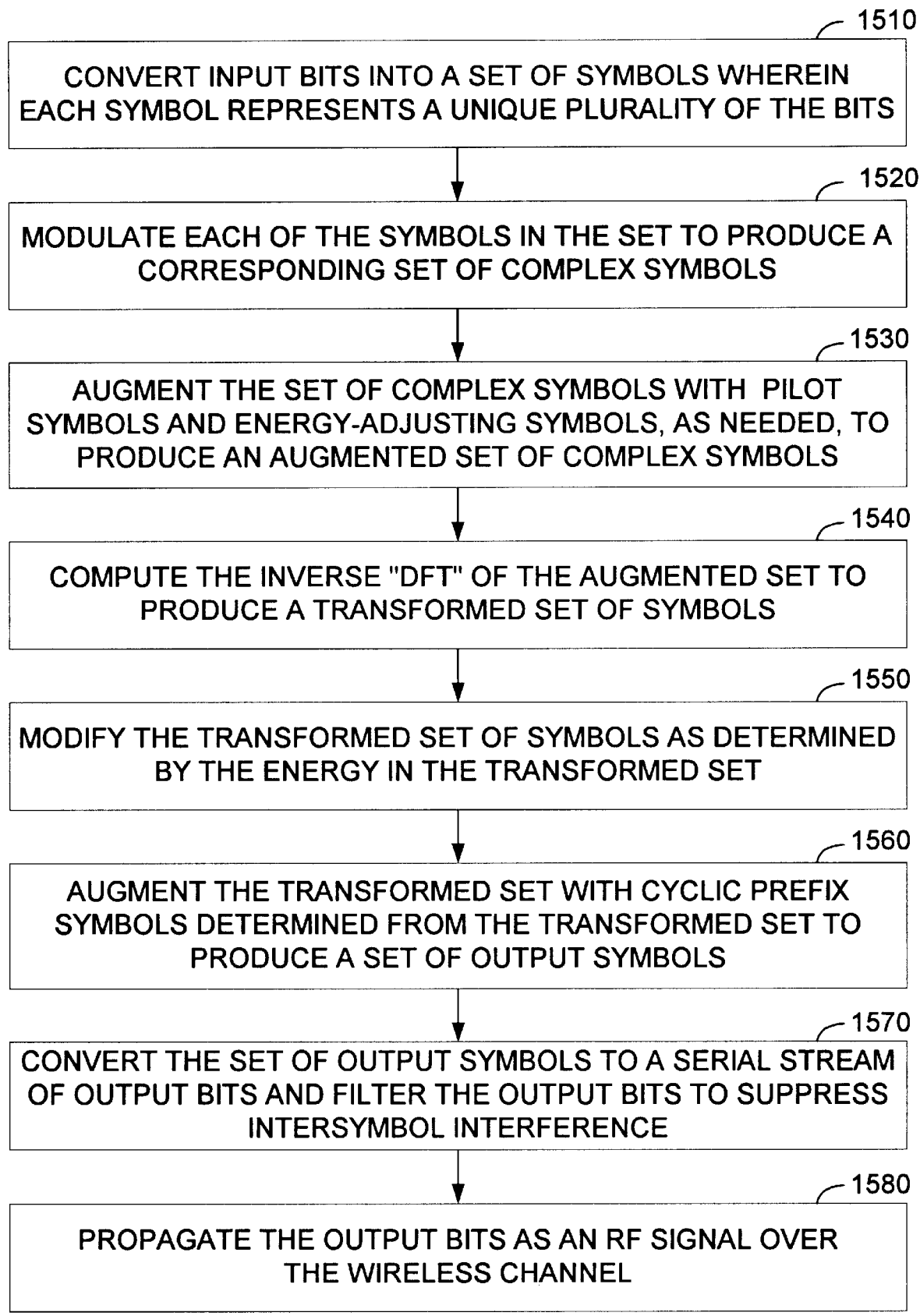
FIG. 15 is a flow diagram depicting the operational steps carried out by the transmitter of FIG. 3.

The flow diagram of FIG. 15 depicts the operational steps carried out by transmitter 300 in its most generic realization. In particular, the processing effected by transmitter 300 is carried out by processing blocks 1510–1580 as follows:

1510: convert input bits into a set of unique symbols wherein each symbol represents a unique plurality of bits;

1520: modulate each of the symbols in the set to produce a corresponding set of complex symbols;

1530: augment the set of complex symbols with pilot symbols and energy-adjusting symbols (e.g., PAR symbols), as needed, to produce an augmented set of complex symbols;

1540: compute the inverse Discrete Fourier Transform of the augmented set to produce a transformed set of symbols;

1550: modify the transformed set of symbols as determined by the energy in the transformed set;

1560: augment the transformed set with cyclic prefix symbols determined from the transformed set to produce a set of output symbols;

1570: convert the set of output symbols to a serial stream of output bits and filter the output bits to suppress intersymbol interference; and 1580: propagate the output bits as an RF signal over the wireless channel.

Receiver 400

Figure 16:
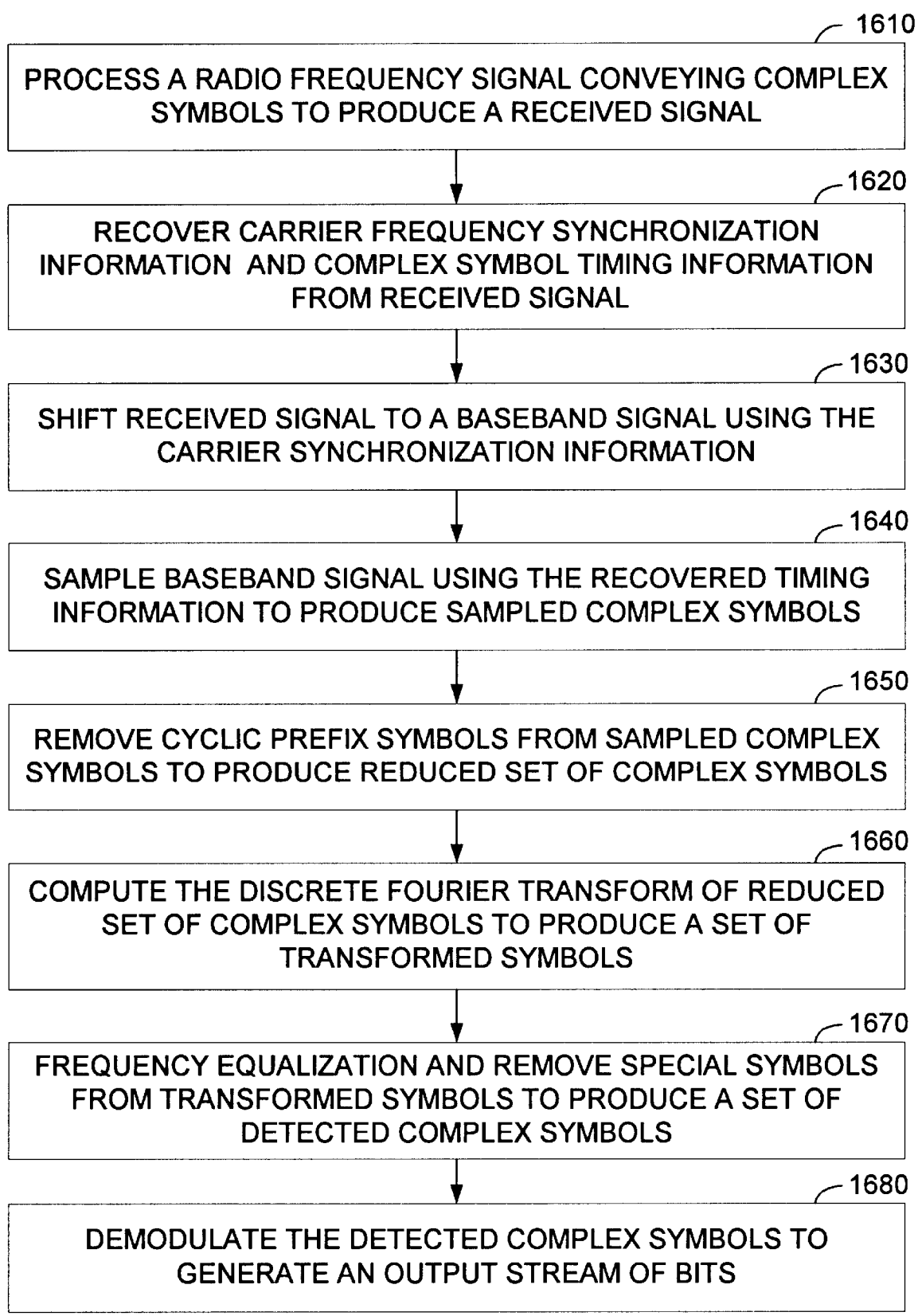
FIG. 16 is a flow diagram depicting the operational steps carried out by the receiver of FIG. 10.

The flow diagram of FIG. 16 depicts the operational steps carried out by receiver 400 in its most generic realization. In particular, the processing effected by receiver 400 is carried out by processing blocks 1610–1680 as follows, wherein it is assumed there are no other diversity branches:

1610: process a radio frequency signal conveying complex symbols to produce a received signal;

1620: recover carrier frequency synchronization information and complex symbol timing information from the received signal;

1630: shift the received signal to a baseband signal using the carrier synchronization information;

1640: sample the baseband signal using the recovered timing information to produce sampled complex symbols;

1650: remove cyclic prefix symbols from the sampled complex symbols to produce a reduced set of complex symbols;

1660: compute the Discrete Fourier Transform of the reduced set of complex symbols to produce a set of transformed symbols;

1670: frequency equalization and remove special symbols from the transformed symbols to produce a set of detected complex symbols; and 1680: demodulate the detected complex symbols to generate an output stream of bits.

Figure 17:
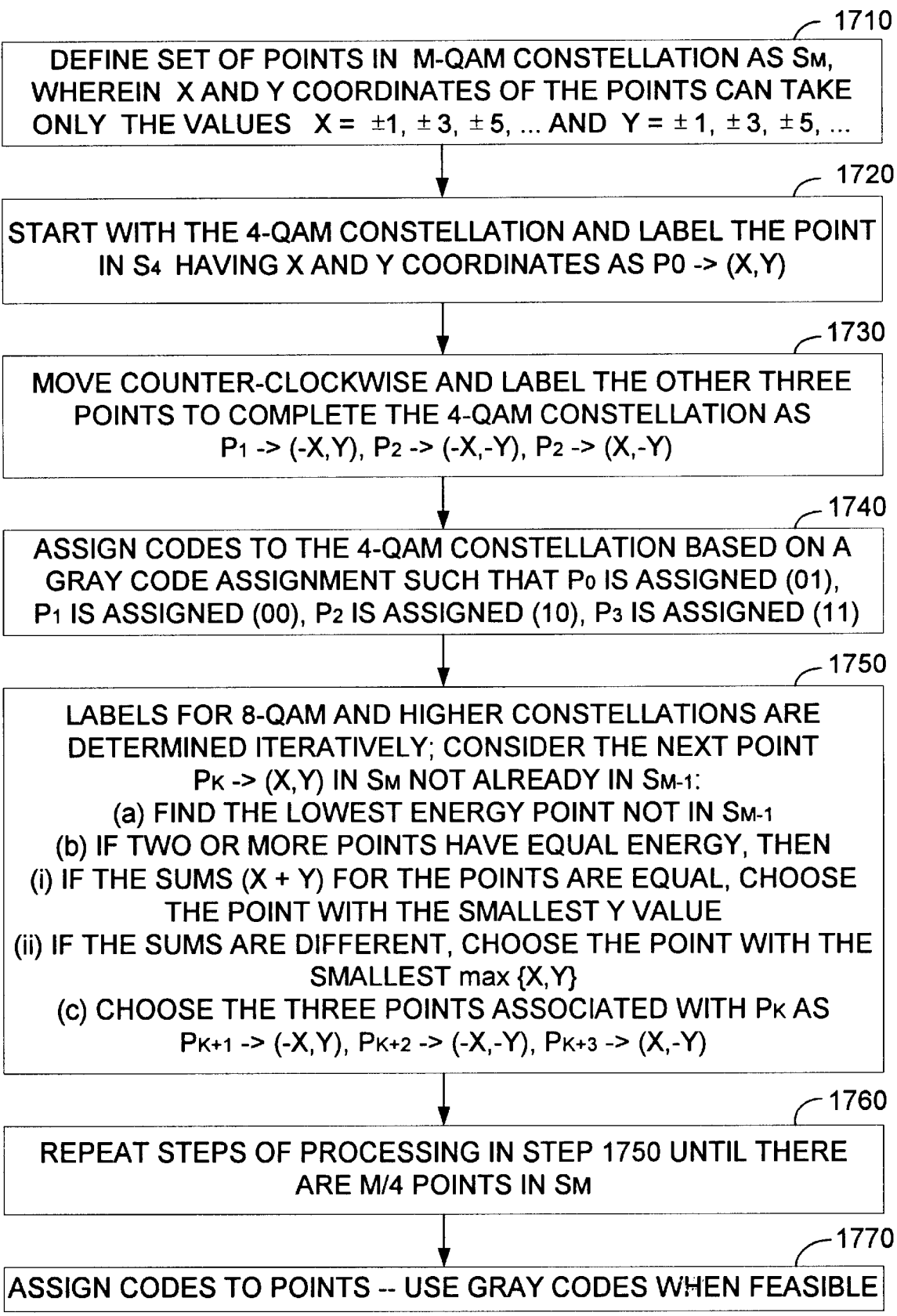
FIG. 17 is a flow diagram for generating the look-up table utilized for both modulation and demodulation.

Flow Diagram to Generate the Look-Table Utilized for Modulation and Demodulation The flow diagram of FIG. 17 depicts the operational steps carried out off-line to produce the look-up table for modulation and demodulation. The steps have been set forth in detail in a foregoing section, but are reiterated here in correspondence to the processing blocks of FIG. 17.

1710: define the set of points in the first quadrant of the M-QAM constellation as $S_M$, wherein the x and y coordinates of the points can take on only the values x=±1, ±3, ±5, ... and y=±1, ±3, ±5, ...

1720: start with the 4-QAM constellation and label the point in $S_4$ having x and y coordinates as $P_0$, i.e., $P_0 \rightarrow (x,y)$.

1730: move in a counter-clockwise direction and label the other three points to complete the 4-QAM constellation as $P_1 \rightarrow (-x,y)$, $P_2 \rightarrow (-x,-y)$, and $P_3 \rightarrow (X,-y)$. The depiction of FIG. 4A illustrates the location of these constellation points.

1740: assign codes to the 4-QAM constellation based on a Gray code assignment such that $P_0$ has associated Gray code (01), $P_1$ has associated Gray code (00), $P_2$ is assigned (10), and $P_3$ is assigned (11).

1750: labels for the 8-QAM and higher constellation points are determined in an iterative manner. Consider first the next point $P_k \rightarrow (x,y)$ in $S_M$ not already in $S_{M-1}$.
(a) find the lowest energy point $x^2 + y^2$ not in $S_{M-1}$.

(b) if two or more points have equal energy, then
   (i) if the sums (x+y) for the points are equal, choose the point with the smallest y value
   (ii) if the sums are different, choose the point with the smallest max {x,y}
(c) choose the three points associated with $P_k$ as $P_{k+1} \rightarrow (-x,y)$, $P_{k+2} \rightarrow (-x,-y)$, and $P_{k+3} \rightarrow (x,-y)$

1760: repeat processing step 1750 until there are M/4 points in $S_M$

1770: assign codes to the constellation points, using Gray codes when feasible, according to the following rules:
(a) if the M-QAM constellation is square, and $2^L$=M, then assign Gray codes to the constellation points based on an L/2 Gray code assignment to the decomposed in-phase and quadrature components
(b) if the M-QAM constellation is not square, then decompose it into the least number of contiguous square blocks, assign Gray codes to them based upon an int[L/2]-bit and {L−int[L/2]}-bit Gray code assignment. (Note that int[r] means integer division). If there are points in the constellation where Gray codes cannot be assigned, assign other codes that minimize the distance with neighboring points.

Process of Modulation Carried Out by Modulator 320

Figure 18:
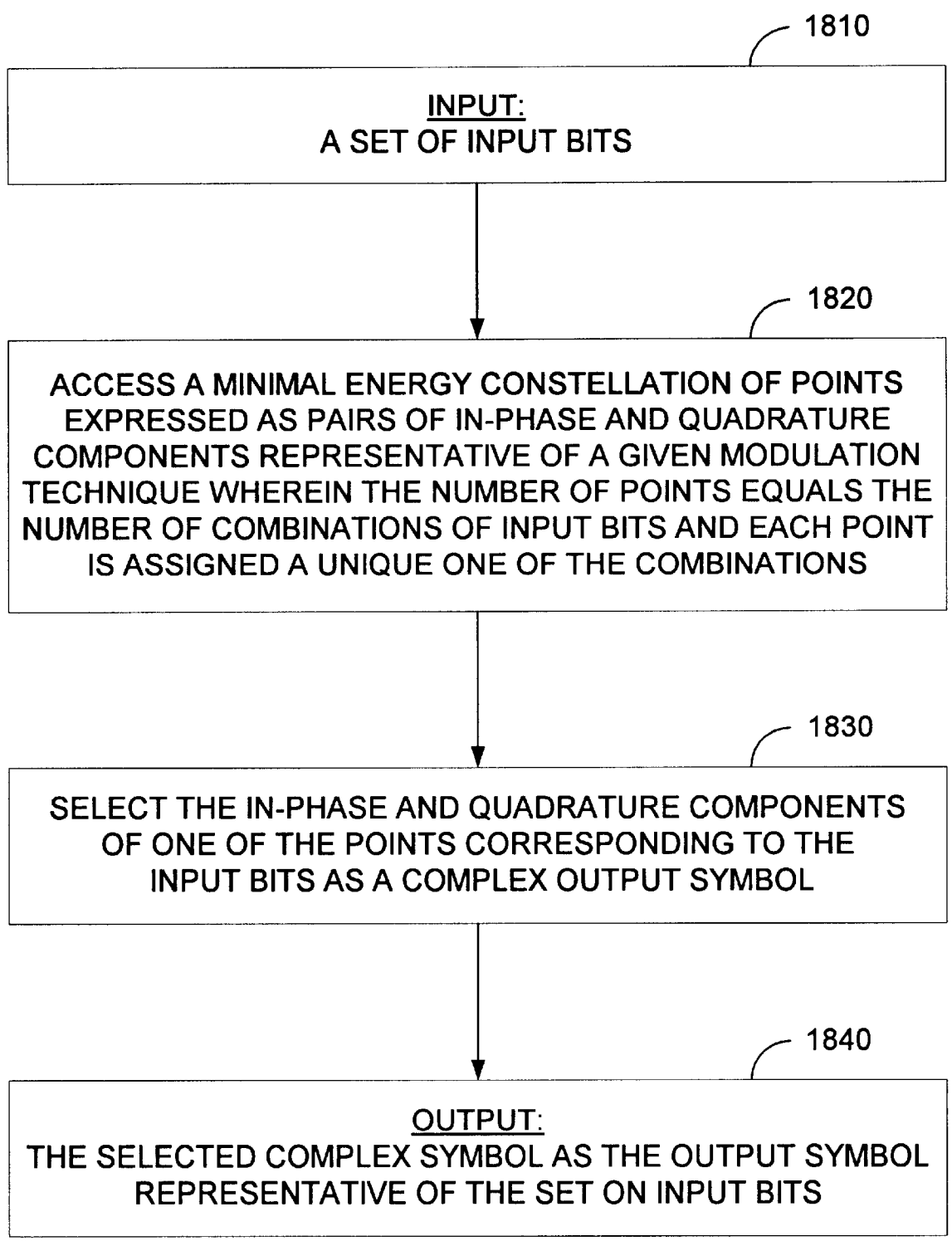
FIG. 18 is a flow diagram depicting the operational steps carried out by the modulator of FIG. 3.

The flow diagram of FIG. 18 depicts the operational steps effected for modulation in transmitter 300. The steps have been set forth in detail in a foregoing section, but are reiterated here in correspondence to the processing blocks of FIG. 18.

1810: the input for processing is composed of a set of input bits;

1820: access a minimal energy constellation of points expressed as pairs of in-phase and quadrature components representative of a given modulation technique wherein the number of points equals the number of combinations of input bits and each point is assigned a unique one of the combinations (the constellation of points is determined in a manner commensurate with the flow diagram of FIG. 17);

1830: select the in-phase and quadrature components of one of the points corresponding to the input bits as a complex output symbol; and

1840: the selected complex symbol is the output symbol representative of the set of input bits.

Process of Demodulation Carried Out by Demodulator 460

Figure 19:
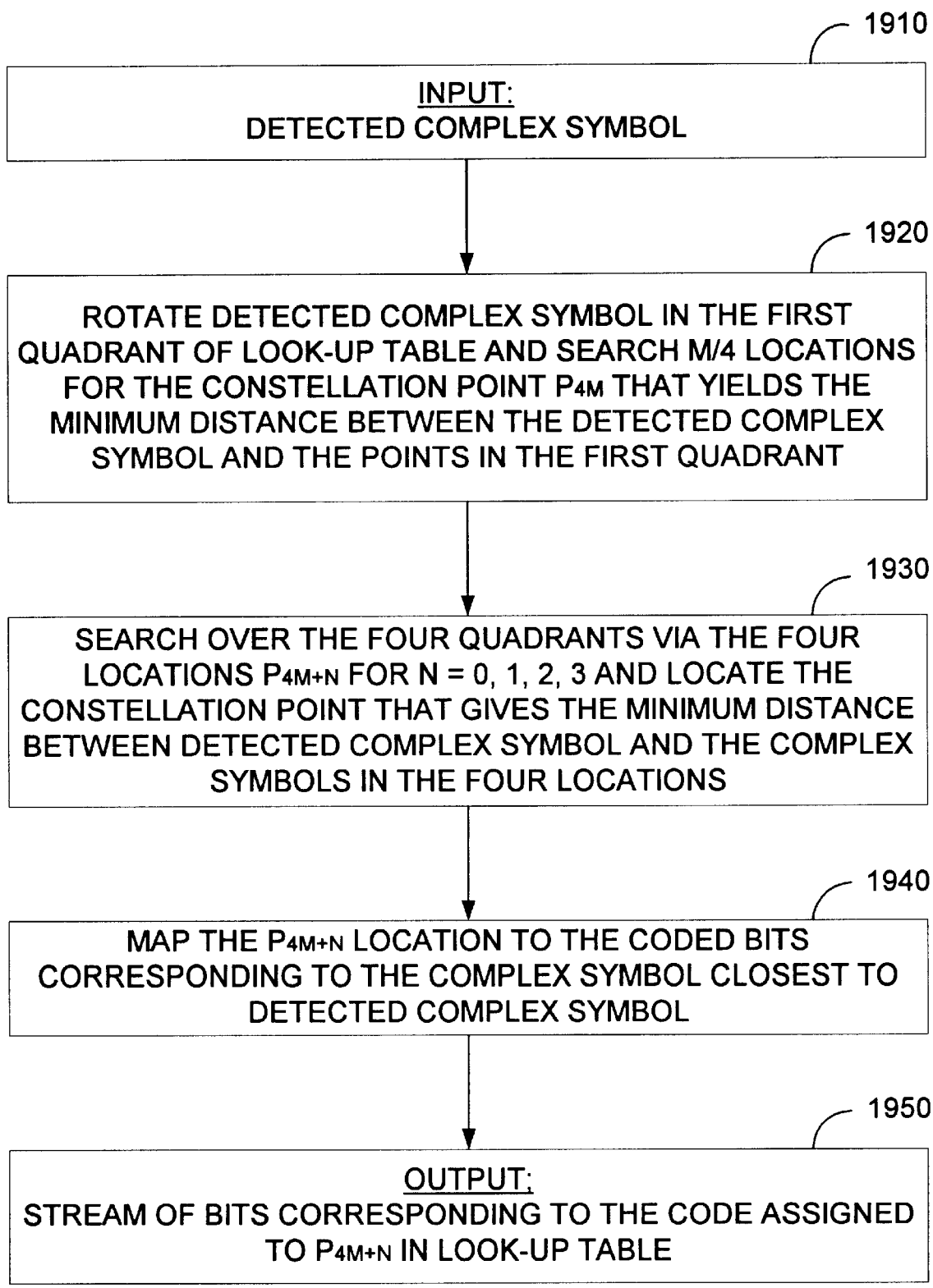
FIG. 19 is a flow diagram depicting the operational steps carried out by the demodulator of FIG. 10.

The flow diagram of FIG. 19 depicts the operational steps effected for demodulation in receive 400. The steps have been set forth in detail in a foregoing section, but are reiterated here in correspondence to the processing blocks of FIG. 19.

1910: the input to the process is a detected complex symbol;

1920: rotate the detected complex symbol, denoted as $c_k \rightarrow (x_k, y_k)$, into the first quadrant and search M/4 locations for the constellation point that yields the "minimum distance" computation defined as follows:

$$\min\{(x-|x_k|)^2 + (y-|y_k|)^2\},$$

where $P_{4k} \rightarrow (x,y)$ for k=0, 1, 2, . . . , M/4. Suppose the k-value yielding the minimum is denoted m.

1930: search over the four quadrants via the four locations $P_{4m+n}$ for n=0, 1, 2, 3 and locate the constellation point that gives the minimum distance between $c_k \rightarrow (x_k, y_k)$ and the complex symbols at the four locations.

1940: map the $P_{4m+n}$ location to the (Gray) coded bits corresponding to the complex symbol closest to the detected complex symbol.

1950: the output of the process is a stream of bits corresponding to the code assigned to $P_{4m+n}$ in the look-up table.

Although various embodiments which incorporate the teachings of the present invention have been shown and described in detail herein, those skilled in the art can readily devise many other varied embodiments that still incorporate these teachings.

What is claimed is:

1. A system for propagating a sequence of input bits as a wireless channel comprising a converter for converting the sequence of input bits into a corresponding set of input symbols wherein each of the input symbols represents a unique plurality of the input bits, a modulator for modulating each of the input symbols in the set to produce a corresponding set of complex symbols, each of the complex symbols having an in-phase component and a quadrature component expressed as a pair for a given modulation technique and said modulator including circuitry for accessing a minimal energy constellation of points expressed as pairs of phase and quadrature components representative of the given modulation technique wherein the number of points equals the number of combinations of input bits in any of the input symbols such that each of the points is assigned a unique one of the combinations, and a selector for selecting the in-phase and quadrature components of one of the points for each of the input symbols as the corresponding one of the complex symbols, means for determining the minimal energy constellation points upon intialization of the system, a storage device for storing the constellation for accessibility by the modulator, a transform processor for computing the inverse Discrete Fourier Transform of the set of complex symbols to produce a transformed set of symbols, circuitry for augmenting the transformed set of symbols with cyclic prefix symbols determined with reference to the transformed set to produce a set of output symbols, and a signal processor for processing the set of output symbols to generate the wireless channel signal, and wherein the given modulation technique is M-level Quadrature Amplitude Modulation (M-QAM) and the means for determining the minimum energy constellation points includes means for defining a set of constellation points for the M-QAM constellation as $S_M$, means for labeling, for the 4-QAM constellation, the point $S_4$ having x and y coordinates as $P_0$, i.e., $P_0 \rightarrow (-x,y)$, means for labeling the other three points $P_1$, $P_2$, and $P_3$ in a counter clockwise direction to complete the 4-QAM constellation as $P_1 \rightarrow (x,y)$, $P_2 \rightarrow (-x,-y)$, and $P_3 \rightarrow (x,-y)$, means for iteratively labeling constellation points for 8-QAM and higher by defining the next point with coordinates $P_k, P_k \rightarrow (x,y)$ in $S_M$ not already in $S_{M-}$ and determining the lowest energy point $x^2 + y^2$ not in $S_{M-1}$ using the following rules if two or more points have equal energy:

Rule 1—if the sums (x+y) for the points are equal, choose the point with the smallest y value;

Rule 2—if the sums are different, choose the point with the smallest max {x,y}, means for choosing the three points $P_{k+1}$, $P_{k+2}$, and $P_{k+3}$ associated with $P_k$ as $P_{k+1} \rightarrow (-x,y)$, $P_{k+2} \rightarrow (-x,-y)$, and $P_{k+3} \rightarrow (x,-y)$, and means for repeating the iteratively operating means for labeling and means for choosing until there are M/4 points in $S_M$.

2. The system as recited in claim 1 wherein the means for determining further includes means for assigning codes to the constellation points based on a Gray code assignment whenever feasible.

3. A system for generating a set of output bits representative of a complex input symbol, the complex input symbol having an in-phase component and a quadrature component expressed as a pair for a given demodulation technique based upon M-level Quadrature Amplitude Modulation (M-QAM), the system comprising a look-up table composed of a minimal energy constellation of points expressed as pairs of in-phase and quadrature components representative of the given demodulation technique wherein the number of points equals the number of combinations of output bits in the set and such that each of the points is assigned a unique one of the combinations, a storage device for storing the look-up table, a selector for identifying one of the unique combinations as the output bits corresponding to said each of the complex symbols by comparing the in-phase and quadrature components of said each of the complex symbols to the points in the constellation with reference to a comparison measure to identify said one of the unique combinations, and means for determining the look-up table upon initialization of the system, said means for determining including means for defining a set of constellation points for the M-QAM constellation as $S_M$.

means for labeling, for the 4-QAM constellation, the point $S_4$ having x and y coordinates as $P_0$, i.e., $P_0 \rightarrow (x,y)$, means for labeling the other three points $P_1$, $P_2$, and $P_3$ in a counter-clockwise direction to complete the 4-QAM constellation as $P_1 \rightarrow (-x,y)$, $P_2$ $(-x,-y)$, and $P_3 \rightarrow (x,-y)$, means for iteratively labeling constellation points for 8-QAM and higher by defining the next point with coordinates $P_k$, $P_k \rightarrow (x,y)$ in $S_M$ not already in $S_{M-1}$ and determining the lowest energy point $x^2+y^2$ not in $S_{M-1}$ using the following two rules if two or more points have equal energy:

Rule 1—if the sums (x+y) for the points are equal, choose the point with smallest y value;

Rule 2—if the sums are different, choose the point with the smallest max {x,y}, means for choosing the three points $P_{k+1}$, $P_{k+2}$, and $P_{k+3}$ associated with $P_k$ as $P_{k+1} \rightarrow (-x,y)$, $P_{k+2} \rightarrow (-x,-y)$, and $P_{k+3} \rightarrow (x,-y)$, and means for repeating the iteratively operating means for labeling and the means for choosing until there are M/4 points in $S_M$.

4. The system as recited in claim 3 wherein the means for determining further includes means for assigning codes to the constellation points based on a Gray code assignment whenever feasible.

5. A method for genemling a complex symbol representative of a set of input bits, the complex symbol having an in-phase component and a quadrature component expressed as a pair for a modulation technique, the method comprising the steps of:

accessing a minimal energy constellation of points expressed as pairs of in-phase and quadrature components representative of the given modulation technique wherein the number of points equals the number of combinations of input bits in the set and such that each of the points is assigned a unique one of the combinations, selecting the in-phase and quadrature components of one of the points corresponding to the input bits as the complex output symbol, determining the minimal energy constellation of points upon initialization of the method, and storing the constellation for accessibility by the step of selecting, and wherein the given modulation technique is M-level Quadrature Amplitude Modulation (M-QAM) and the step of determining includes the steps of defining a set of constellation points for the M-QAM constellation as $S_M$, labeling, for the 4-QAM constellation, the point in $S_4$ having x and y coordinates as $P_{0 \rightarrow (x,y)}$, labeling the other three points in a counter-clockwise direction to complete the 4-QAM constellation as $P_1 \rightarrow$ $(-x,y)$, $P_2 \rightarrow (x,y)$, and $P_3 \rightarrow (x,y)$, and, after the second step of labeling.

assigning codes to the 4-QAM constellation points based on a Gray code assignment, iteratively labeling constellation points for the 8-QAM and higher by defining the next point $P_k \rightarrow (x,y)$ in the $S_M$ not already in the $S_{M-1}$ and determining to lowest energy point $x^2+y^2$ not in $S_{M-1}$ using the following rules if two or more points have equal energy:

Rule 1-if the sums of (x+y) for the points are equal, choose the point with the smallest y value;

Rule 2-if the sums are different, choose the point with the smallest max (x,y), choosing the three points associated with $P_k$ as $P_{k+1}$ $\rightarrow (-x,y)$, $P_{k+2} \rightarrow (-x,-y)$, and $P_{k+3} \rightarrow (x,-y)$, and repeating the iteratively labeling and choosing steps until there are at M/4 points in $S_M$.

6. The method as recited in claim 5 wherein the step of determining further includes the step of assigning codes to the constellation points based on a Gray code assignment whenever feasible.

* * * * *

UNITED STATES PATENT AND TRADEMARK OFFICE
CERTIFICATE OF CORRECTION

PATENT NO. : 6,633,614 B1
DATED : October 14, 2003
INVENTOR(S) : Melbourne Barton et al.

It is certified that error appears in the above-identified patent and that said Letters Patent is hereby corrected as shown below:

Column 24,
Line 8, change "genemling" to -- generating --.
Line 43, change "to" to -- the --.
Line 53, after "there are", delete "at".

Signed and Sealed this

Fifteenth Day of November, 2005

JON W. DUDAS
*Director of the United States Patent and Trademark Office*